(12) United States Patent
Wong

(10) Patent No.: US 8,019,967 B2
(45) Date of Patent: Sep. 13, 2011

(54) ROBUST INDEX STORAGE FOR NON-VOLATILE MEMORY

(75) Inventor: Wanmo Wong, Menlo Park, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 12/794,066

(22) Filed: Jun. 4, 2010

(65) Prior Publication Data

US 2010/0241798 A1    Sep. 23, 2010

Related U.S. Application Data

(60) Continuation of application No. 12/372,153, filed on Feb. 17, 2009, now Pat. No. 7,734,891, which is a division of application No. 11/148,028, filed on Jun. 8, 2005, now Pat. No. 7,509,474.

(51) Int. Cl.
   *G06F 12/00* (2006.01)
(52) U.S. Cl. .......................... 711/206; 711/103
(58) Field of Classification Search .................. 711/206, 711/103
   See application file for complete search history.

(56) References Cited

U.S. PATENT DOCUMENTS

| | | | |
|---|---|---|---|
| 4,876,646 A | 10/1989 | Gotou et al. | |
| 5,247,658 A | 9/1993 | Barrett et al. | |
| 5,287,475 A | 2/1994 | Sawamoto | |
| 5,544,356 A | 8/1996 | Robinson et al. | |
| 5,673,383 A | 9/1997 | Sukegawa | |
| 5,832,493 A * | 11/1998 | Marshall et al. | 707/697 |
| 5,946,714 A | 8/1999 | Miyauchi | |
| 5,978,808 A | 11/1999 | Wells et al. | |
| 6,282,605 B1 * | 8/2001 | Moore | 711/103 |
| 6,282,624 B1 | 8/2001 | Kimura et al. | |
| 6,339,752 B1 * | 1/2002 | Mann et al. | 703/26 |
| 6,418,523 B2 | 7/2002 | Porterfield | |
| 6,591,329 B1 | 7/2003 | Kakinuma et al. | |
| 6,895,486 B2 | 5/2005 | Wong et al. | |
| 6,928,531 B2 | 8/2005 | Wong | |
| 6,938,140 B2 | 8/2005 | Louie et al. | |
| 7,340,581 B2 * | 3/2008 | Gorobets et al. | 711/202 |
| 2003/0014607 A1 | 1/2003 | Slavin et al. | |
| 2004/0015674 A1 | 1/2004 | Lakhani et al. | |
| 2004/0044836 A1 | 3/2004 | Wong et al. | |
| 2004/0044840 A1 | 3/2004 | Wong | |

(Continued)

FOREIGN PATENT DOCUMENTS

EP        0 487 331 A2    5/1992

*Primary Examiner* — Hashem Farrokh
(74) *Attorney, Agent, or Firm* — Leffert Jay & Polglaze, P.A.

(57) ABSTRACT

A non-volatile memory data address translation scheme is described that utilizes a hierarchal address translation system that is stored in the non-volatile memory itself. Embodiments of the present invention utilize a hierarchal address data and translation system wherein the address translation data entries are stored in one or more data structures/tables in the hierarchy, one or more of which can be updated in-place multiple times without having to overwrite data. This hierarchal address translation data structure and multiple update of data entries in the individual tables/data structures allow the hierarchal address translation data structure to be efficiently stored in a non-volatile memory array without markedly inducing write fatigue or adversely affecting the lifetime of the part. The hierarchal address translation of embodiments of the present invention also allow for an address translation layer that does not have to be resident in system RAM for operation.

12 Claims, 19 Drawing Sheets

U.S. PATENT DOCUMENTS

| | | |
|---|---|---|
| 2004/0044858 A1 | 3/2004 | Wong et al. |
| 2005/0015378 A1 | 1/2005 | Gammel et al. |
| 2005/0057973 A1 | 3/2005 | Khatami et al. |
| 2005/0108491 A1 | 5/2005 | Wong et al. |
| 2006/0161723 A1 | 7/2006 | Sena et al. |

* cited by examiner

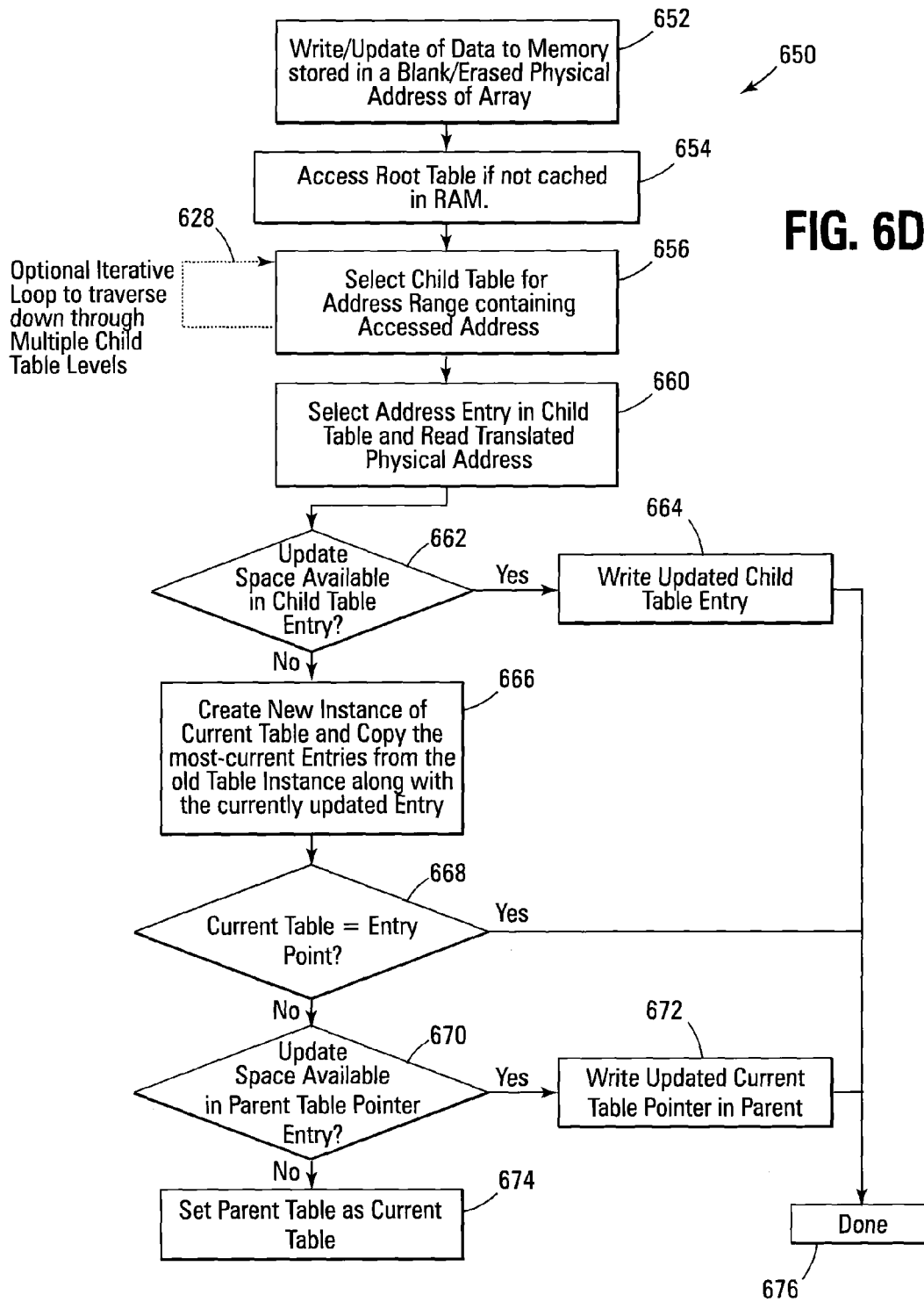

ROBUST INDEX STORAGE FOR NON-VOLATILE MEMORY

CROSS-REFERENCE TO RELATED APPLICATIONS

This is a Continuation application of U.S. application Ser. No. 12/372,153, titled "ROBUST INDEX STORAGE FOR NON-VOLATILE MEMORY," filed Feb. 17, 2009 now U.S. Pat. No. 7,734,891 (allowed), which is a Divisional Application of U.S. application Ser. No. 11/148,028, titled "ROBUST INDEX STORAGE FOR NON-VOLATILE MEMORY," filed Jun. 8, 2005, now issued as U.S. Pat. No. 7,509,474, all of which are commonly assigned and the entire contents of which are incorporated herein by reference.

TECHNICAL FIELD OF THE INVENTION

The present invention relates generally to integrated circuits and in particular the present invention relates to sector address translation and sector update of non-volatile memory devices.

BACKGROUND OF THE INVENTION

Memory devices are typically provided as internal storage areas in a computer. The term memory identifies data storage that comes in the form of integrated circuit chips. There are several different types of memory used in modern electronics, one common type is RAM (random-access memory). RAM is characteristically found in use as main memory in a computer environment. RAM refers to read and write memory; that is, data can be both written to and read from RAM. This is in contrast to ROM, which permits only the reading of data. Most RAM is volatile, which means that it requires a steady flow of electricity to maintain its contents. As soon as the power is turned off, whatever data was in RAM is lost.

Computers almost always contain a small amount of read-only memory (ROM) that holds instructions for starting up the computer. Unlike RAM, ROM cannot be written to. An EEPROM (electrically erasable programmable read-only memory) is a special type non-volatile ROM that can be erased by exposing it to an electrical charge. EEPROM comprise a large number of memory cells having electrically isolated gates (floating gates). Data is stored in the memory cells in the form of charge on the floating gates. Charge is transported to or removed from the floating gates by specialized programming and erase operations, respectively.

Yet another type of non-volatile memory is a Flash memory. A Flash memory is a type of EEPROM that can be erased and reprogrammed in blocks instead of one byte at a time. A typical Flash memory comprises a memory array, which includes a large number of memory cells. Each of the memory cells includes a floating gate field-effect transistor capable of holding a charge. The data in a cell is determined by the presence or absence of the charge in the floating gate. The cells are usually grouped into sections called "erase blocks." The memory cells of a Flash memory array are typically arranged into a "NOR" architecture (the cells arranged in an array of rows and columns, each cell directly coupled to a bitline) or a "NAND" architecture (cells coupled into "strings" of cells, such that each cell is coupled indirectly to a bitline and requires activating the other cells of the string for access). Each of the cells within an erase block can be electrically programmed in a random basis by charging the floating gate. The charge can be removed from the floating gate by a block erase operation, wherein all floating gate memory cells in the erase block are erased in a single operation. Other types of non-volatile memory include, but are not limited to, Polymer Memory, Ferroelectric Random Access Memory (FeRAM), Ovionics Unified Memory (OUM), Nitride Read Only Memory (NROM), Carbon Nanotube memory, and Magnetoresistive Random Access Memory (MRAM).

Because all the cells in an erase block of a Flash memory device must generally be erased all at once, one cannot directly rewrite a Flash memory cell without first engaging in a block erase operation. Erase block management (EBM) provides an abstraction layer for this to the host, allowing the Flash device to appear as a freely rewriteable device. Erase block management also allows for load leveling of the internal floating gate memory cells to help prevent write fatigue failure. Write fatigue is where the floating gate memory cell, after repetitive writes and erasures, no longer properly erases. Load leveling procedures increase the mean time between failure of the erase block and Flash memory device as a whole.

In many modern Flash memory devices implementations, the host interface and/or erase block management routines additionally allow the Flash memory device to appear as a read/write mass storage device (i.e., a magnetic disk) to the host, storing data in the Flash memory in 512-byte sectors. As stated above, the erase block management routines/address translation layer provide the necessary linkage between the host and the internal Flash memory device erase block array, logically mapping logical sectors to physical sectors on the Flash device and managing block erasure.

To accomplish this mapping of a logical sector to a physical sector in the Flash memory of the prior art, either a table is kept in RAM or the physical sectors are scanned for the physical sector that contains the requested logical sector address. With the data storage capacity of modern Flash memories increasing issues are being caused with the size of the required RAM table and/or the time required to scan the Flash memory for the requested sector. This is particularly an important issue in resource limited handheld or embedded devices.

For the reasons stated above, and for other reasons stated below which will become apparent to those skilled in the art upon reading and understanding the present specification, there is a need in the art for a non-volatile memory device and/or erase block management with improved logical to physical sector mapping.

BRIEF DESCRIPTION OF THE DRAWINGS

FIGS. 6A-6E detail flowcharts of hierarchal address translation in accordance with embodiments of the present invention.

DETAILED DESCRIPTION OF THE INVENTION

Figure 1:
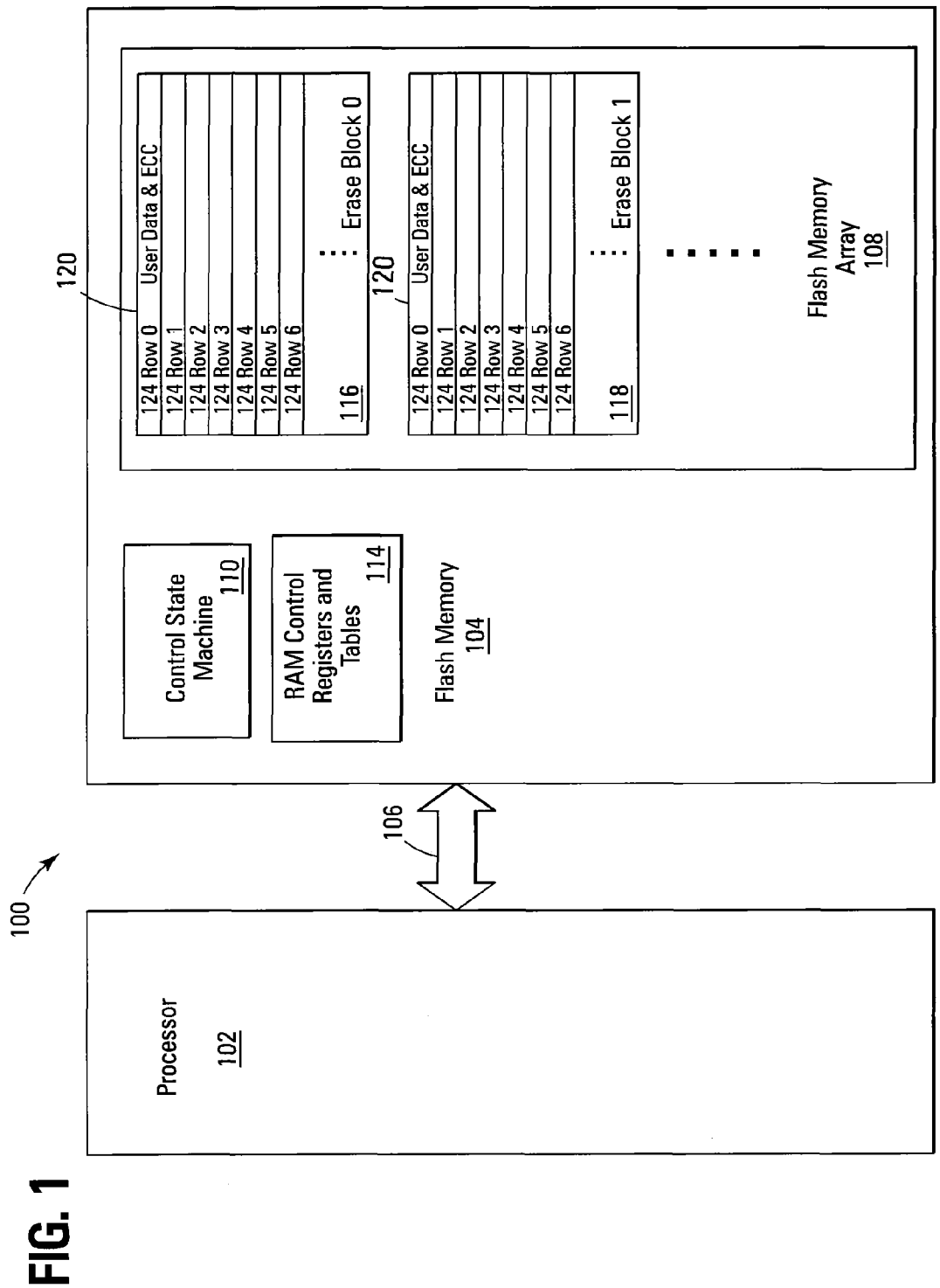
FIG. 1 details a memory system with a memory and memory controller in accordance with embodiments of the present invention.

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

As stated above, the various embodiments relate to non-volatile memory devices that utilize a hierarchal address translation system that stores the address translation data in the non-volatile memory array in a hierarchal data structure. In non-volatile memory devices, and in particular Flash memory devices, because all the cells in an erase block of a non-volatile memory device must be erased at once, one cannot directly rewrite a block erased non-volatile memory cell without first engaging in a block erase operation. This characteristic typically restricts non-volatile memory devices from directly storing data that is frequently updated, as each data change would require the entire data structure to be relocated and force the erase blocks to be frequently reclaimed and scheduled for erasure. In addition, write fatigue further restricts the use of both block erase and non-block erase non-volatile memory in storing frequently updated data and data structures. As such, address translation tables, which enable the operation of the non-volatile memory as a freely rewriteable device with the erase block management (EBM) abstraction layer and store the information for translating the logical address of a memory access request to the physical address and/or physical erase block where the requested data is stored, are typically held and updated in RAM during operation and not written back to non-volatile memory until power-down or some other triggering event requires it to be.

Embodiments of the present invention store address translation data in a hierarchal data structure, wherein the data entries are held in one or more data structures/tables arranged in a hierarchal tree and can be updated multiple times without having to overwrite and/or move data. This allows the data structures and tables of the hierarchal address translation data structure to be updated in-place multiple times without having to be moved/erased as the underlying data/sectors of the memory array are moved or updated, as would be required with a conventional address translation table. This hierarchal address translation data structure and multiple update capability of data entries in the individual tables/data structures allow the hierarchal address translation data structure to be efficiently stored in a non-volatile memory array without overly increasing write fatigue or adversely affecting the lifetime of the part. The hierarchal address translation of embodiments of the present invention also allow for an address translation layer that can be utilized directly from the non-volatile memory address space and does not have to be resident in system RAM for operation; or allow for a reduced presence in system RAM by the caching of selected tables and data structures.

Because all the cells in an erase block of a non-volatile memory device, and in particular, a Flash memory device, are generally erased all at once, one cannot directly rewrite a memory cell without first engaging in a block erase operation. Erase Block Management (EBM), typically under the control of an internal state machine, an external memory controller, or software driver, provides an abstraction layer for this to the host (a system, a processor or an external memory controller), allowing the non-volatile device to appear as a freely rewriteable device. Erase block management also provides routines for managing the array of the Flash memory device, including, but not limited to, managing the logical address to physical address translation mapping with the translation layer, assigning of erased and available erase blocks for utilization, marking old data blocks/sectors as invalid after the data has been moved or updated and written in a new data block/sector, and scheduling erase blocks that have been used and closed out for block erasure. EBM also allows for load leveling of the internal floating gate memory cells to help prevent write fatigue failure.

A translation layer in conjunction with the erase block management manages the storage of logical sectors in non-volatile memory devices or a non-volatile memory subsystem. The client of a translation layer is typically the file system or operating system of an associated system or processor. The goal of the translation layer/EBM layer is to make the non-volatile memory appear as a freely rewriteable device or magnetic disk/hard drive, by remapping logical addresses of accesses to differing physical addresses when new data is written and/or old data invalidated allowing the old location to be block erased and reclaimed for future use. It is noted that other translation layers can allow the direct reading and writing of data to a non-volatile memory without presenting the non-volatile memory as a formatted file system.

FIG. 1 is a simplified diagram of a system 100 that incorporates a Flash memory device 104 embodiment of the present invention. In the system 100 of FIG. 1, the Flash memory 104 is coupled to a processor 102 with an address/data bus 106. Internally to the Flash memory device, a control state machine 110 directs internal operation of the Flash memory device; managing the Flash memory array 108 and updating control registers and tables 114. The Flash memory array 108 contains floating gate memory cells arranged in a sequence of erase blocks 116, 118. Each erase block 116, 118 contains a series of physical pages or rows 120, each page containing physical storage for one or more logical sectors or logical data blocks 124 (referred to herein as a logical sector and shown in FIG. 1 for illustration purposes as a single logical sector 124 per physical page/row 120) that contain a user data space and a control/overhead data space. The control data space contains overhead information for operation of the logical sector 124, such as an error correction code (not shown), status flags, logical sector ID, or an erase block management data field area (not shown). The user data space in each logical sector 124 is typically 512 bytes long. It is noted that other interfaces to the Flash memory 104 and formats for the erase blocks 116, 118, physical pages 120, and logical sectors/blocks 124 are possible and should be apparent to those skilled in the art with benefit of the present disclosure. It is also noted that additional Flash memory devices 104 may be incorporated into the system 100 as required. In FIG. 1, the logical sectors contain version number data fields which are written with a version number when the logical sectors are used to store data, and address translation of the logical sector address to physical block/sector address in the Flash memory 104 utilizes version based address translation incorporating embodiments of the present invention.

Figure 2A:
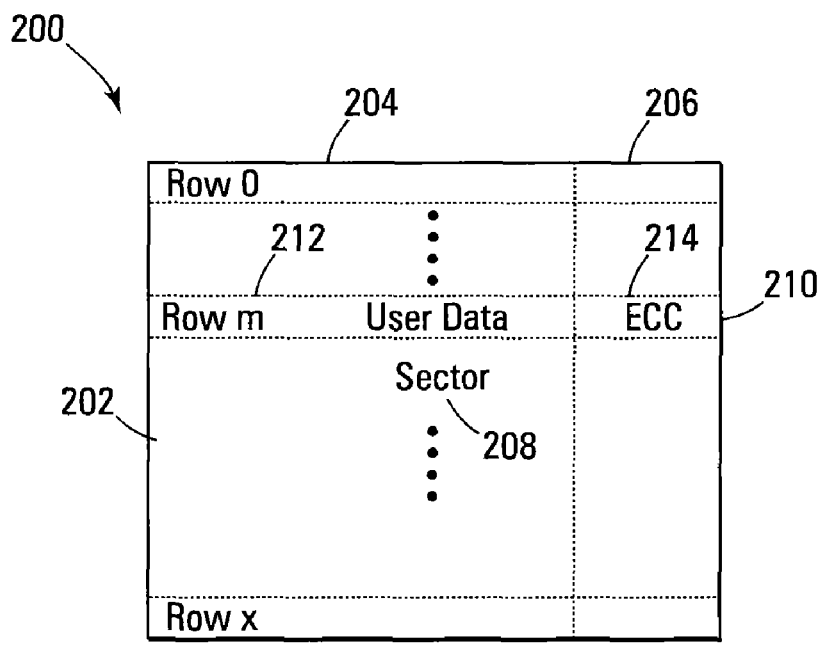
FIGS. 2A and 2B detail encoding of logical address blocks/sectors in Flash memory arrays in accordance with embodiments of the present invention.
Figure 2B:
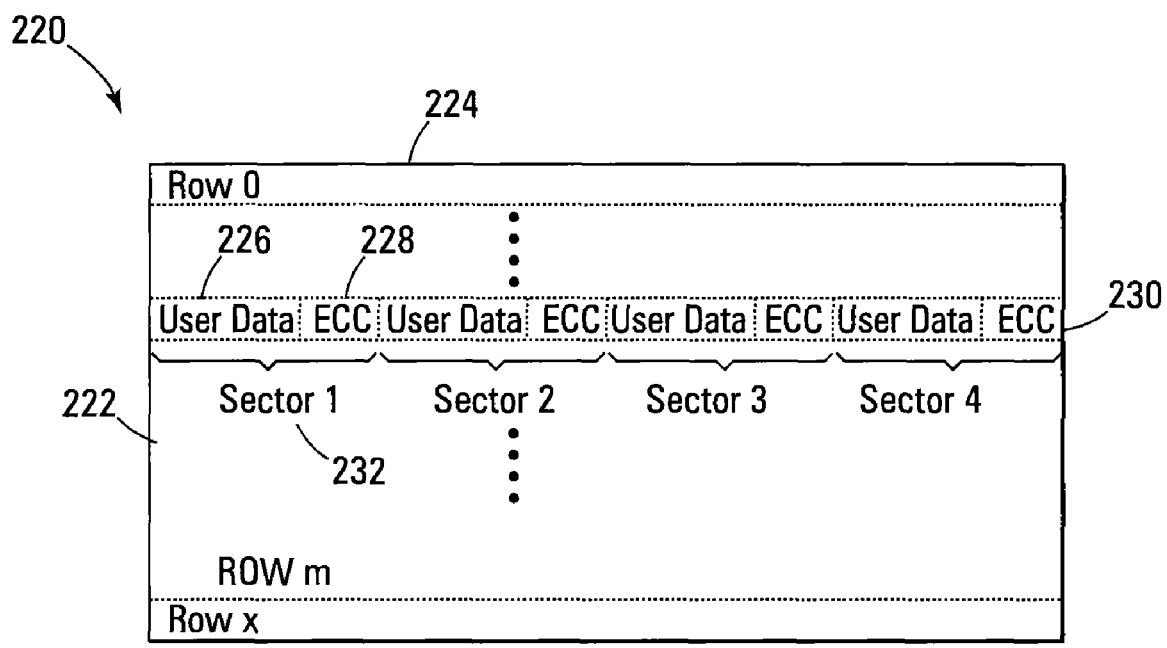

FIGS. 2A and 2B detail encoding 200, 220 of user data into logical sectors of a Flash memory array. In FIG. 2A, user data 212 and header/overhead data 214 is shown in a memory array 202 (or into an erase block N of a memory array 202), where a single 512-byte logical sector is encoded in each physical page/row 210 of the memory array 202. The memory array 202 contains a series of rows 210, each row containing a logical sector having a user data area 204 and an overhead data area 206.

In FIG. 2B, user data 226 and header/overhead data 228 is shown in a memory array 222 (or into an erase block N of a memory array 222), where a multiple logical sectors 232 are encoded in each physical page/row 230 of the memory array 222. As stated above, many memories support multiple logical sectors 232 within a single physical row page 230. In particular, NAND architecture Flash memories typically utilize this approach due to their generally higher memory cell density and larger row page sizes. The memory row 230 contains multiple logical sectors 232 (Sector 1, Sector 2, Sector 3 and Sector 4), each logical sector 232 having a user data area 226 and an overhead data/block header section 228. The overhead data/block header section 228 of each logical sector is typically stored at the end of the row and will generally contain an ECC, a logical sector ID, and other overhead/management data for the data stored in the user data area 226 of the sector 232. It is noted that the row pages 210 and 230 of FIGS. 2A and 2B are for illustration purposes and that other row page sector formats of differing data sizes, numbers of logical sectors, and relative positioning of sectors are possible.

Figure 3A:
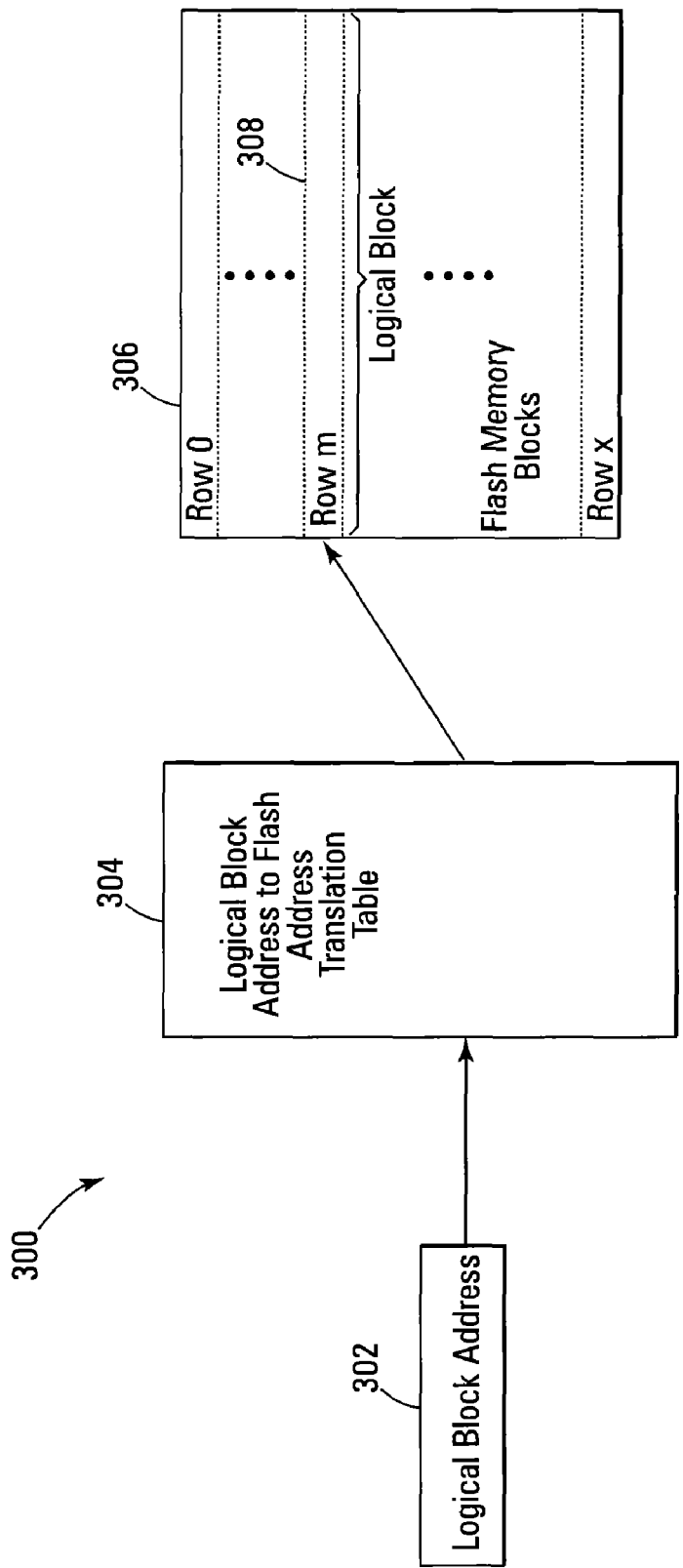
FIG. 3A details a block diagram of a logical sector address translation in a memory system of the prior art.

In prior art memory systems, the address translation layer translates the accessed logical sectors to a physical block address through the use of a lookup table or, alternatively, through a scan of the physical blocks of the non-volatile memory system or device. FIG. 3A details a simplified block diagram of a prior art lookup table address translation system 300. In FIG. 3A, a logical sector address 302 of a sector read/write access request is submitted to the address translation layer (not shown, but can be either a firmware routine executing on a processor of a system, address translation hardware of a memory controller or in a control circuit internal to the memory itself) which translates it to a physical block address by reference to a lookup table 304, which is typically held in RAM. The address translation system 300 then uses the translated logical address to access the indicated physical block from a row 308 of a non-volatile memory array 306. In a prior art physical scan address translation system, the physical blocks 308 of the memory array 306 would be scanned by the address translation system 300 for a header that contained the matching logical sector address 302.

Figure 3B:
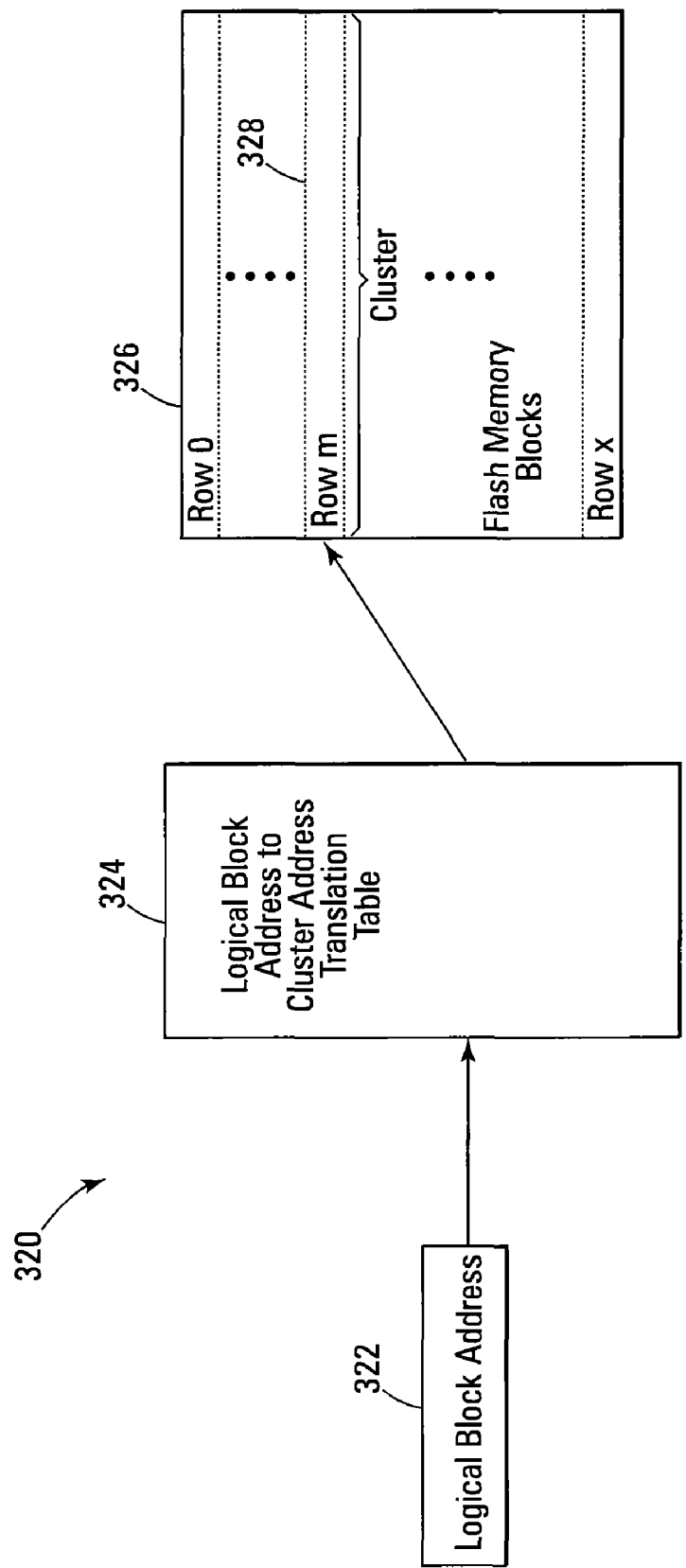
FIGS. 3B and 3C detail block diagrams of cluster based logical sector address translation in accordance with embodiments of the present invention.

A cluster based address translation in non-volatile memories has been disclosed that allows for a reduced address translation table by utilizing clusters of sequentially addressed sectors. This cluster based addressing process is detailed in U.S. patent application Ser. No. 10/933,017, titled "CLUSTER BASED NON-VOLATILE MEMORY TRANSLATION LAYER", Filed Sep. 2, 2004, and which is commonly assigned. FIG. 3B details a simplified block diagram of such a cluster based lookup table address translation system 320. In FIG. 3B, a logical sector address 322 of a sector read/write access request is submitted to the cluster based address translation layer (not shown) which translates it to a physical cluster address by reference to a cluster address lookup table 324. A logical sector address index to the selected logical sector within the cluster is also generated. The address translation system 320 then uses the translated cluster address (typically: accessed address divided by the number of sectors in a cluster) and the logical sector index (typically: accessed address modulus the number of sectors in a cluster) to access the indicated physical sector from a row 328 of a non-volatile memory array 326. It is noted that each cluster typically contains two or more sequentially addressed logical sectors and can be defined to be of any granularity size, such that a cluster may incorporate one or more rows of the memory array.

Figure 3C:
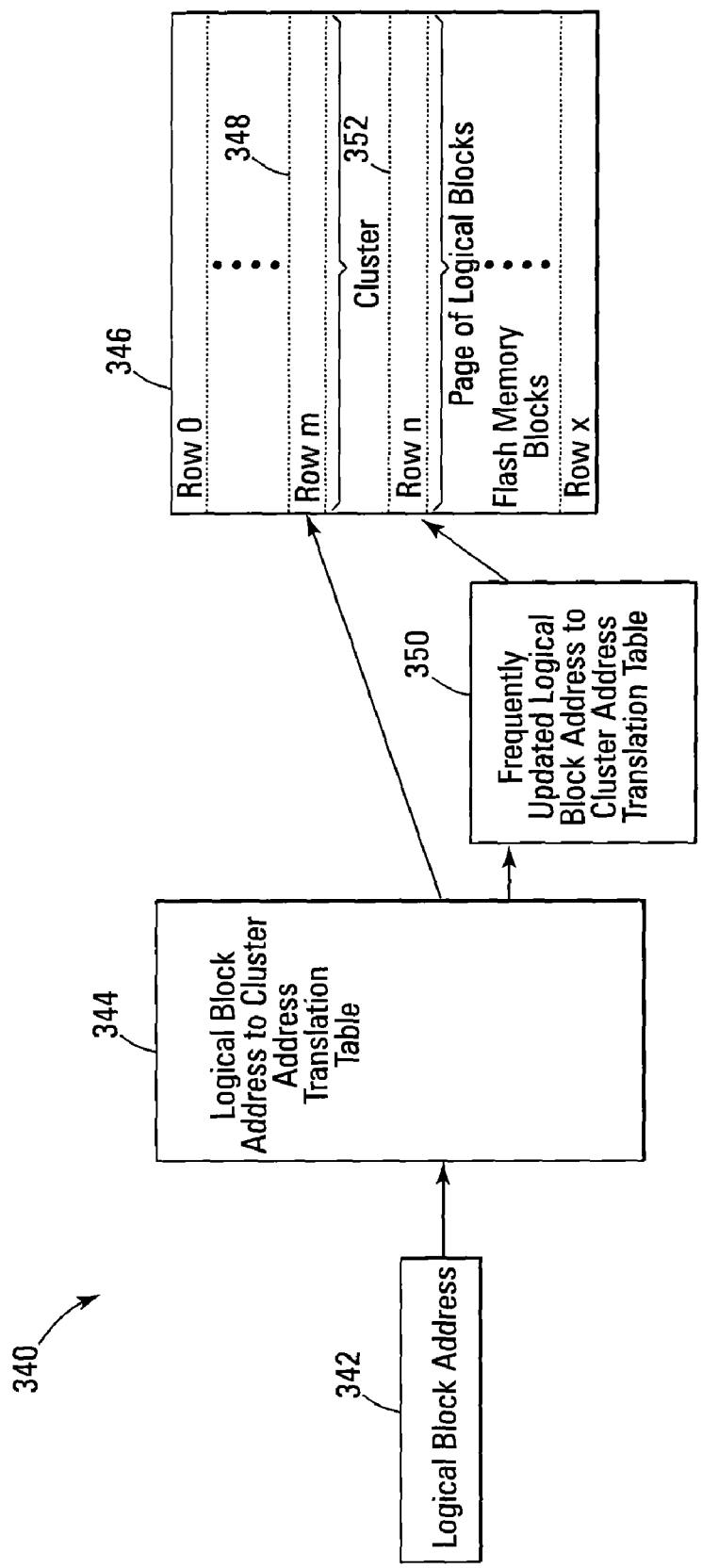

FIG. 3C details a simplified block diagram of a cluster based lookup table address translation system 340 that incorporates frequently updated sector cluster addressing. In FIG. 3C, a logical sector address 342 of a sector read/write access request is submitted to the cluster based address translation layer (not shown) which, if it is not a frequently updated logical sector, translates it to a physical cluster address by reference to a cluster address lookup table 344. A logical sector address index to the selected logical sector within the cluster is also generated. The address translation system 340 then uses the translated physical cluster address and the logical sector index into the physical cluster to access the indicated physical block from a row 348 of a non-volatile memory array 346. If the logical sector address is for a frequently updated logical sector, the address lookup is done on a separate logical sector address lookup table 350 that only handles address translation for frequently updated logical sectors. The address translation system 340 then uses the translated cluster address the physical address from the frequently updated logical sector address lookup table 350 to access the indicated cluster/page of logical sectors 352 and select the most recently updated logical sector from it, allowing the frequently updated logical sectors to be managed on a separate basis.

Figure 4A:
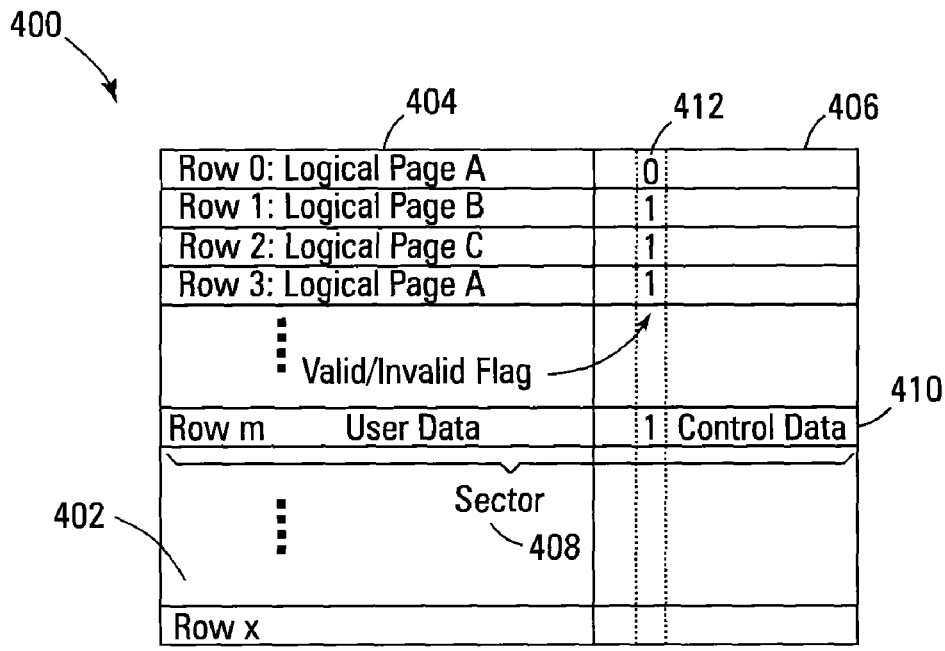
FIG. 4A details encoding of logical sectors and valid/invalid flags in an erase block of a memory system of the prior art.

FIG. 4A details prior art encoding 400 of logical sectors incorporating valid/invalid data flags in a Flash memory array. In FIG. 4A, user data 404 and header/overhead data 406 are shown in a memory array 402 (or in an erase block N of a memory array 402) of the prior art, where a single 512-byte logical sector is encoded in each physical page/row 410 of the memory array 402. The control data area 406 incorporates a valid/invalid data flag 412 that is programmed from "1" to "0" when the data held in that sector is invalidated. Logical Sectors/Pages A, B, and C are shown written into Rows 0 to 2 of the memory array 402 of FIG. 4A. Logical Page/Sector A is shown as being updated and moved from Row 0 to Row 3, with the old data Logical Page/Sector A of Row 0 being invalidated by the programming of the valid/invalid flag 412 from a "1" to a "0".

Figure 4B:
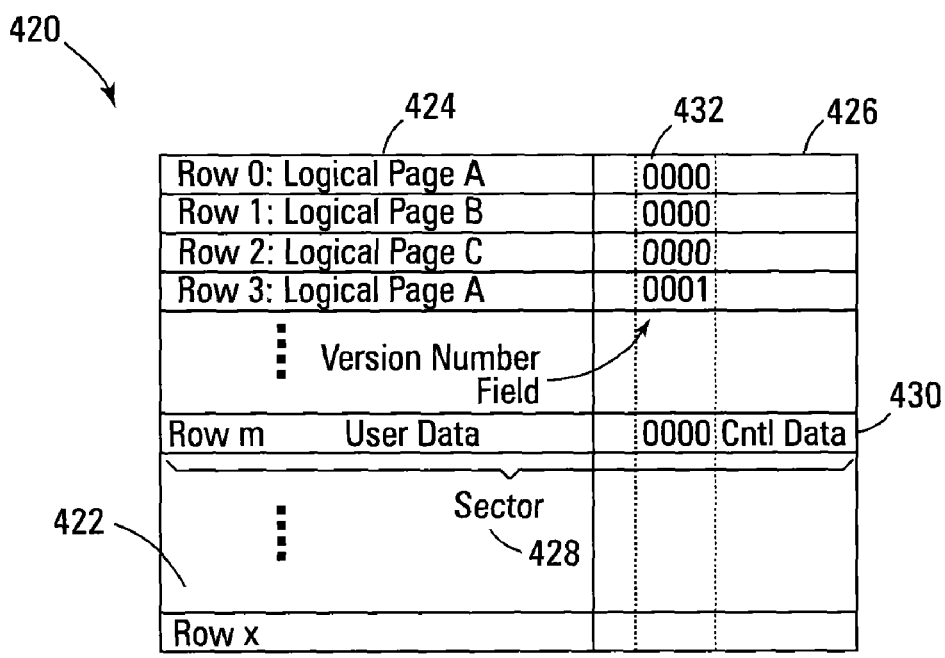
FIGS. 4B and 4C detail encoding of a version based logical sectors with version data fields in accordance with embodiments of the present invention.
Figure 4C:
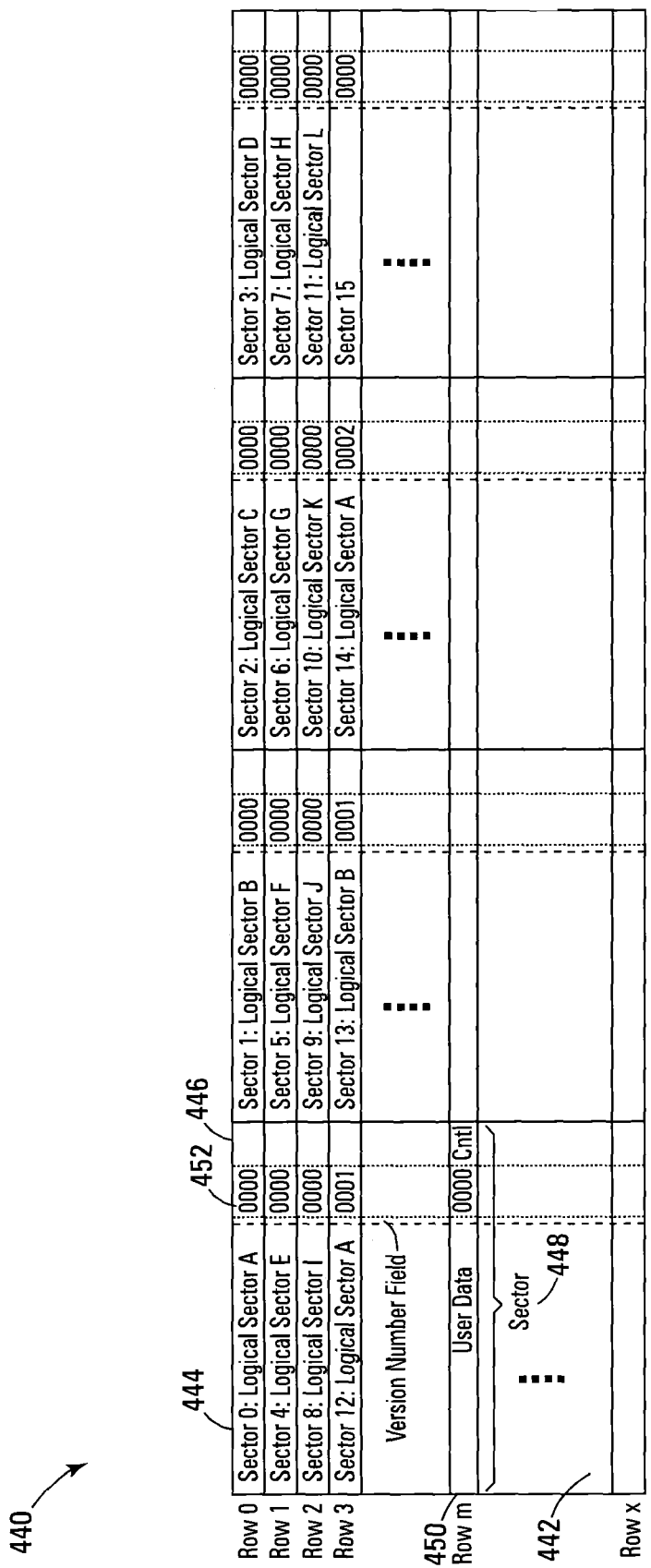

A version number based data validation and address translation in non-volatile memories has been disclosed that allows for a reduced address translation table by utilizing clusters of sequentially addressed sectors. This cluster based addressing process is detailed in U.S. patent application Ser. No. 11/136,152, titled "VERSION BASED NON-VOLATILE MEMORY TRANSLATION LAYER", and which is commonly assigned. FIGS. 4B and 4C detail encoding 420, 440 of logical sectors/logical data blocks incorporating such version number data fields. In FIG. 4B, user data 424 and header/overhead data 426 are shown in a memory array 422 (or into an erase block N of a memory array 422) utilizing version number validation of data. The memory array 422 contains a series of rows 430, each row containing a sector having a user data area 424 and a control/overhead data area 426. The control data area 426 incorporates a version number data field 432 that is programmed with a version number when the data held in that sector is initially written. Logical Pages/Sectors A, B, and C are shown written into Rows 0 to 2 of the memory array 422 of FIG. 4B. Logical Page/Sector A is shown as being updated and moved from Row 0 to Row 3 and written with a new version number of "0001H" as incremented from the original version number of "0000H" stored in Row 0. It is noted in version number based addressing, that version numbers can be applied to any data structure in the non-volatile memory array, allowing control structures, tables, and erase blocks themselves to be addressed via version number address translation. It is also noted that in cluster based addressing the cluster as a whole can have a version number assigned, allowing the individual sectors to not have to have their own assigned version numbers. It is further noted that older version numbers of selected sectors and control data structures that contain critical data can be kept to increase the robustness of the erase block management/address translation layer and/or the specific end user application stored on it.

In FIG. 4C, user data 444 and header/overhead data 446 are shown in a memory array 442 (or into an erase block N of a memory array 442) utilizing version number validation of data, where multiple logical sectors 448 are encoded in each physical page/row 450 of the memory array 442, each sector 448 including a version number data field 452. Each memory row 450 contains multiple logical sectors 448, each logical sector 448 having a user data area 444 and a control/overhead data section 446. In an example implementation, the row page 450 of FIG. 4C contains 2112 bytes of data (4×512 bytes user data+4×8 bytes ECC+32 bytes for overhead) and is formatted to contain four logical sectors 448 having a user data area 444 of 512-bytes each. The four logical sectors 448 are typically sequentially addressed N, N+1, N+2, and N+3, particularly in cluster addressed embodiments, where N is a base logical sector address for the row page 450. It is noted that the row pages 430 and 450 of FIGS. 4B and 4C are for illustration purposes and that other row page sector formats of differing data sizes, numbers of logical sectors, and relative positioning of sectors are possible. Logical Sectors A-D, E-H, and I-L are shown written into Rows 0 to 2, respectively, of the memory array 442 of FIG. 4C. Logical Sectors A and B are shown as being updated and moved from Row 0 to new Row 3 and written with a new version numbers of "0001H" as incremented from the original version numbers of "0000H" for Logical Sectors A and B stored in Row 0. Logical Page A is shown as being updated a second time and moved from Sector 12 in Row 3 to Sector 14 of Row 3 and written with a new version number of "0002H" as incremented from the updated version number of "0001H".

In embodiments of the present invention, an accessed address is translated to a physical address in the non-volatile memory array by traversing a hierarchal series of data structures and/or address tables utilizing the characteristics of the accessed address until reaching the child table containing the address translation entry of the address being accessed. This address translation entry is read from the child table to translate the accessed address to a physical address in the non-volatile memory array. The data entries of one or more data structures/tables of the hierarchal data structure can be updated two or more times without having to overwrite and/or move data structure/table being updated within the non-volatile memory array. This allows the hierarchal address translation data structure to be updated in-place in the non-volatile memory array without having to be repeatedly moved/erased as the underlying user data/sectors are moved/updated. In embodiments of the present invention, as more levels of tables/data structures are added to the hierarchal address translation data structure and/or the number of times entries at each level can be updated without requiring the table/data structure storing the data to be moved is increased, the less the tables/data structures of the hierarchal address translation data structure have to be moved and erased, increasing its advantage for use in a non-volatile memory array.

In one embodiment of the present invention, erase block abstraction is also utilized to further abstract the translation of addresses within the address translation layer and further reduce the number of updates to the address translation table. In erase block abstraction the translated addresses from the address translation data table/hierarchy are to addresses in logical erase blocks. These logical erase block addresses must be further translated from logical erase block IDs to a physical erase block ID in the array by reference to a separate Erase Block Translation Table. This erase block abstraction allows the erase blocks of the array to be moved and/or reclaimed and erased without having to update each address entry in the translation layer data that is currently stored in the erase block being moved/reclaimed; the data is simply moved and the logical erase block ID assigned to the new erase block. It is noted that erase block abstraction can be utilized with conventional address translation tables, improving their write fatigue characteristics and speed of reclaim/move operations. It is also noted that erase block abstraction, also being an address translation within the memory array, can be arranged in a hierarchal address translation data structure.

In a further embodiment of the present invention, an Entry Point data structure is stored in a reserved Control Area of the non-volatile memory array. The Control Area allows the Entry Point to not be tied to a fixed address or erase block in the array. This allows it to be moved and updated as the address translation data structure itself is updated and yet still quickly found at start-up by a scan of the Control Area of the memory array. The Control Area and Entry Point data structure also allow the configuration of the memory device to be stored and rapidly accessed, eliminating the need for a scan of the device to characterize it for the translation layer firmware/driver upon power-up.

In a further embodiment of the present invention, cluster address translation is utilized with the hierarchal address translation layer to translate logical sector addresses to physical block addresses. In cluster addressing, each cluster contains a plurality of sequentially addressed data blocks or sectors. This allows the use of a smaller table for the address translation lookup and/or faster scanning of the memory device or memory subsystem for the matching cluster address.

In another embodiment of the present invention, version number validation of data is utilized with the hierarchal address translation layer to select the most current hierarchal translation data and to translate logical sector addresses to physical block addresses. In version number data validation, a version number can be stored for the associated data is stored in a version number data field in each data structure (such as control data/tables, erase blocks, data blocks, sectors, and/or clusters). This allows for determination of currently valid data structure associated with the logical ID of the data by locating the highest version associated with the logical ID. With this approach, old data need not be invalidated by programming a valid/invalid flag, speeding operation and minimizing program disturb risk in the data rows surrounding the old data.

In another embodiment of the present invention, a specially formatted cluster is utilized with the hierarchal address translation data structure for frequently updated logical sectors, where the cluster stores a single logical sector and new sequential physical sectors/blocks of the cluster are written in turn with each new update of the logical sector and the previous physical block holding the old data invalidated until the entire cluster has been used. This allows multiple updates of a logical sector without having to move and invalidate/erase the cluster containing the old data.

Figure 5A:
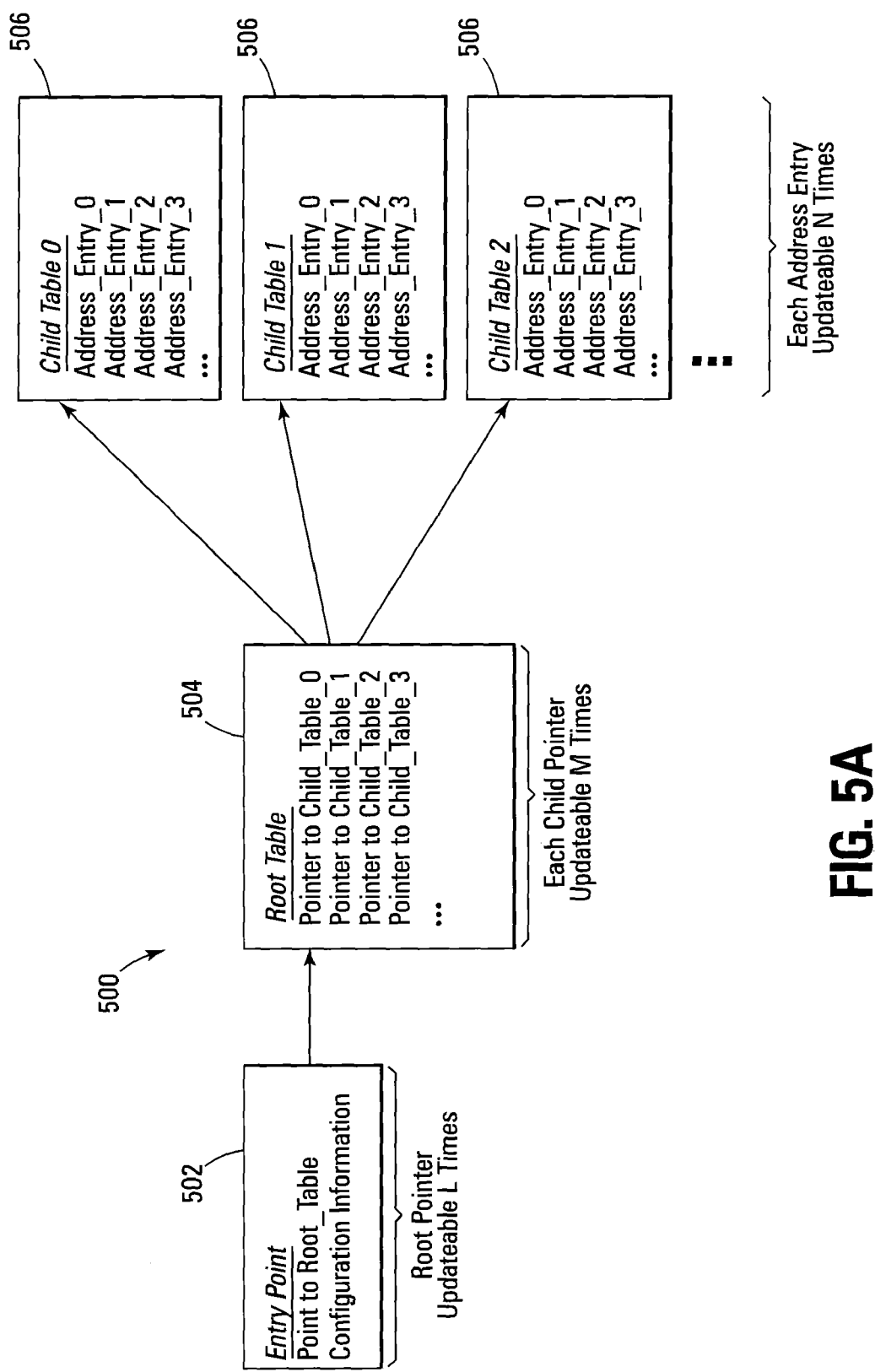
FIGS. 5A and 5B detail hierarchal address translation systems and data structures in accordance with embodiments of the present invention.

FIG. 5A details a simplified block diagram of a hierarchal address translation data structure 500 of an embodiment of the present invention. In FIG. 5A, the hierarchal address translation data structure 500 includes an Entry Point 502, a Root Table 504, and one or more Child Tables 506. The Entry Point 502 resides in a known location or can be located by a scan of a defined Control Area of reserved erase blocks of the non-volatile memory array and contains a pointer entry to the Root Table 504. The Control Area or Entry Point 502 can also contain the configuration data for the memory device, eliminating the need for a scan of the memory device to characterize it for the firmware/driver. In one embodiment of the present invention, the Entry Point 502 is eliminated and Root Table 504 is utilized directly as the entry point. The Root Table 504 contains a series of pointer entries to the physical locations in the memory array of each of the Child Tables 506. The Child Tables are divided by ranges of addresses and contain address translation data entries for the data stored in the non-volatile memory device. Each of the data entries in the Entry Point 502, the Root Table 504, and the one or more Child Tables 506 can be updated L, M, and N times, respectively, (L, M. and N are determined by the number of possible update fields of the data structure, typically L, M, and N are determined based on a selected base unit of storage of the memory device, such as a row and/or sector/cluster size, and the number of times the table or data structure can be updated within in this base unit of storage; e.g., a Child Table data structure that is one sector/512 bytes in size can be updated 4 times in a cluster that is a row of 2048 bytes size and can be divided into 4 logical sectors, if instead the Child Table is 1024 bytes in size, it can be updated twice in the 2048 byte cluster) before the Table/data structure must be moved to a new location in the non-volatile memory array and the pointer entry pointing to it updated in the Table/data structure above it in the hierarchy (the Parent Table).

In FIG. 5A, a logical address of a read/write access request is submitted to the address translation layer which translates it to a physical address by reference to the hierarchal address translation data structure 500. In this translation, the translation layer references the Entry Point 502 to retrieve the address of (the pointer to) the Root Table 504. The Root Table 504 is then read to determine in which Child Table 506 the address of the memory access is stored. The address of (the pointer of) the selected Child Table is then retrieved from the Root Table 504 and the selected Child Table 506 accessed. The address translation entry of the memory access is then retrieved from the Child Table 506 and the translated physical address accessed in the memory array. In this translation, the most recent record (of the L, M, or N number of possible updates for each entry/record) in each data structure/table in the hierarchy is utilized.

As noted above, the address entries are typically stored in the Child Tables by address ranges. Other address mapping functions to the Child Tables 506, such as by hash function, most recently used/updated, or random placement and simple scanning of all entries of the Child Tables 506 to locate an entry, are possible and will be apparent to those skilled in the art with the benefit of the present disclosure. It is also noted that it is possible to further divide each Child Table 506 into smaller subsets of address entries and add one or more further layers of Child Tables below the existing Child Tables 506 to further reduce the size of the final Child Tables at the bottom of the hierarchy. This allows the hierarchal address translation data structure 500 to handle situations where the number of address entries/array size has been increased or the size of the individual address entries themselves have been increased to store additional information on each address being translated without increasing the size of the Root Table 504. As noted above, as more levels of tables/data structures are added to the hierarchal address translation data structure 500 and/or the number of times entries at each level can be updated without requiring the table/data structure storing the data to be moved are increased, the less the tables/data structures of the hierarchal address translation data structure have to be moved and erased.

As stated above, each of the data entries in the Entry Point 502, the Root Table 504, and the one or more Child Tables 506 can be updated L, M, and N times, respectively, before the Table must be moved to a new location in the non-volatile memory array and the pointer entry pointing to the Table updated in the parent Table/data structure above it in the hierarchal tree. In updating the hierarchal address translation data structure 500 after new or updated data is written to the non-volatile memory array, the Child Table 506 that contains the address entry for the new/updated data is first reviewed to check if there is remaining space in the address entry. If space remains (not all N spaces available for the address entry in the Child Table 506 have been written/filled) the new address translation information (the new physical address of the data) is written to the address entry. If the address entry in the Child Table 506 is filled (all N spaces in the address entry have been used), a new Child Table 506 is created and the most recent entries from the old Child Table are copied into it, along with the currently updated address entry. The pointer to Child Table 506 is then changed in the Root Table 504 to point to the new Child Table 506 and the old Child Table 506 scheduled for deletion. If the Child Table entry in the Root Table 504 is filled (all M spaces in the pointer entry have been used), a new Root Table 504 is created and the most recent entries from the old Root Table are copied into it, along with the currently updated Child Table entry/pointer. The pointer to Root Table 504 is then updated in the Entry Point 502 to point to the new Root Table 504 and the old Root Table 504 scheduled for deletion. If the Root Table pointer entry in the Entry Point 502 is filled (all L spaces in the pointer entry have been used), a new Entry Point 502 is created in the Control Area and the most recent entries from the old Entry Point 502 are copied into it, along with the currently updated Root Table entry. The old Entry Point 502 is then scheduled for deletion.

In one embodiment of the present invention, the address data/address entries stored in the hierarchal address translation data structure 500 are direct logical address to physical address translation entries. In another embodiment of the present invention, the address data/address entries stored in the hierarchal address translation data structure 500 are logical cluster address to physical cluster address translation entries. In this cluster based addressing, a logical cluster address (accessed address/number of sectors in a cluster) of a read/write access request is submitted to the address translation layer (not shown) which translates it to a physical cluster address by reference to cluster address translation data which is stored in the hierarchal address translation data structure 500. A sector address index to the selected logical sector within the cluster can also be generated. The address translation system then uses the translated physical cluster address to access the indicated physical sector from a cluster of a non-volatile memory array, with the logical sector index (accessed address modulus the number of sectors in a cluster) or scanning used to select the desired sector from the retrieved physical cluster. In yet another embodiment of the present invention, a specially formatted cluster, called a single sector cluster, is utilized for frequently updated logical sectors. The special single sector cluster stores a single logical sector, where updates to the stored sector are written sequentially to previously unused space in the single sector cluster and the previous sector holding the old data is invalidated until the entire single sector cluster has been used. This allows multiple updates of a logical sector without having to move/erase the cluster containing the old sector data.

In a further embodiment of the present invention, the address translation layer utilizes a version number associated with data stored in the non-volatile memory array, instead of marking data with a valid/invalid data flag. Address translation in data versioning memory embodiments of the present invention utilizes this stored version number in combination with the data grouping's ID (sector logical ID, logical data block ID, cluster logical ID, data structure ID, or data table ID) to translate the logical address to the matching physical address, which contain the current data. In this address translation, a number of physical locations in the memory array associated with the logical ID of the data group are located in the memory array. The version number associated with each of these physical locations is then compared to locate the physical location with the most-current stored version number. In one embodiment of the present invention, accessed address or cluster is translated to a physical erase block, which is then scanned for the sector ID that contains the most-current version number. In another embodiment, the version number for each sector/cluster ID is stored in the hierarchal address translation data structure 500. This allows the physical address with the most recent version number to then be directly utilized for performing the memory access.

It is noted that the data structure/table elements of the hierarchal address translation data structure 500 can be individually marked with version numbers so that old tables/data structures do not need to be invalidated by setting a valid/invalid flag. In one embodiment of the present invention, older versions of these data structure/table elements and/or other selected critical data elements of the non-volatile memory device are reserved to selected version number depths and not reclaimed/erased from the memory array to provide for increased translation system robustness and a limited undo feature. These retained data structure/table elements and/or other selected critical data elements can also be utilized to enhance error correction routines of the non-volatile memory device firmware/driver software if ECC detects an error in the currently valid data structure/table elements and/or other selected critical data elements.

Figure 5B:
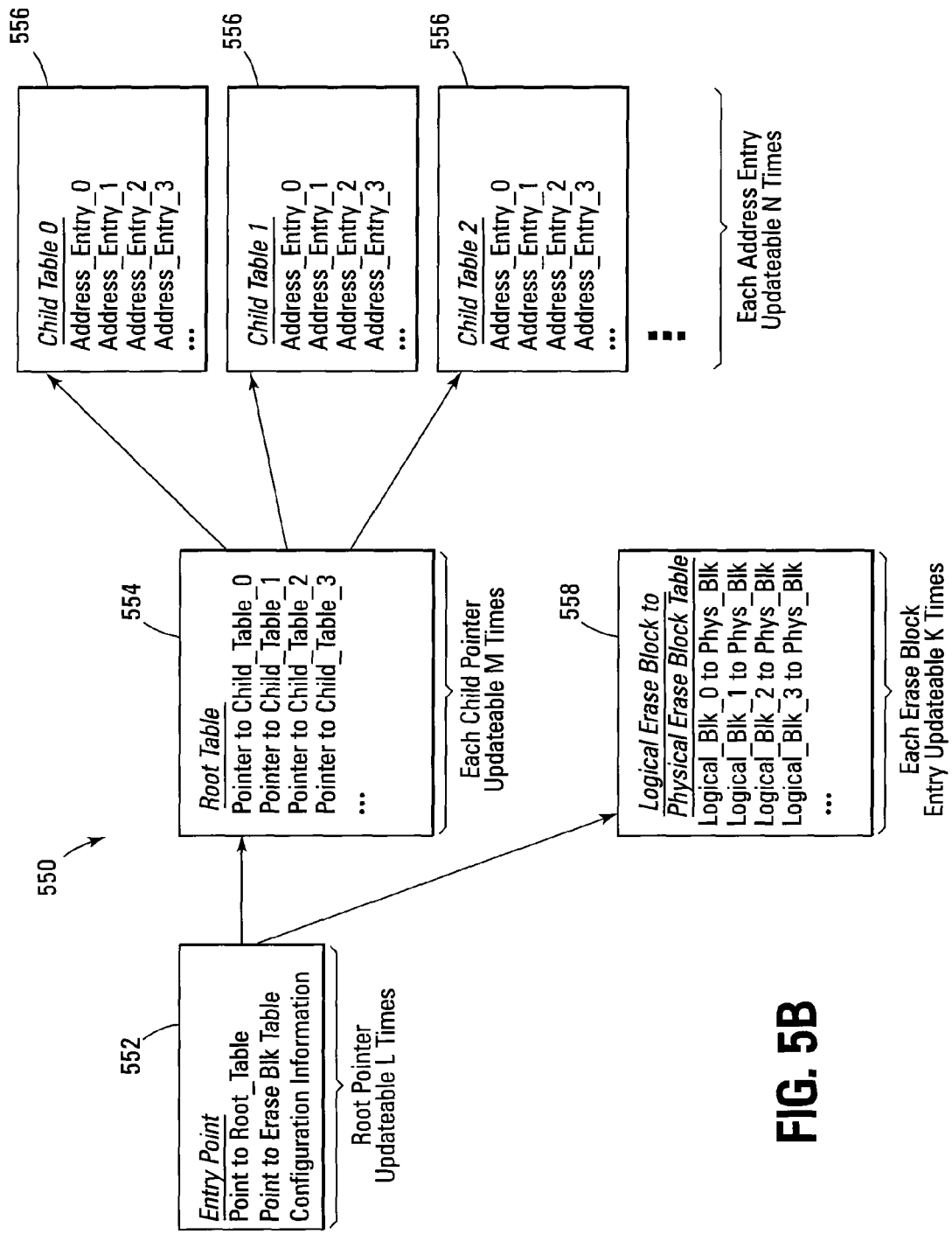

FIG. 5B details a simplified block diagram of a hierarchal address translation data structure 550 of another embodiment of the present invention. In FIG. 5B, the hierarchal address translation data structure 550 includes an Entry Point 552, a Root Table 554, one or more Child Tables 556, and a Logical Erase Block to Physical Erase Block Table 558. As with the hierarchal address translation data structure 500 of FIG. 5A, the Entry Point 552 of the hierarchal address translation data structure 550 of FIG. 5B resides in a known location or can be located by a scan of a defined Control Area of reserved erase blocks of the non-volatile memory array and contains a pointer entry to the Root Table 554. The Root Table 554 contains a series of pointer entries to the physical locations in the memory array of each of the Child Tables 556. The Child Tables are divided by ranges of addresses and contain address translation data entries for the data stored in the non-volatile memory device. The Entry Point 552 also contains a pointer to the current Logical Erase Block to Physical Erase Block Table 558. The Logical Erase Block to Physical Erase Block Table 558 contains logical erase block to physical erase block address translation entries. Each of the data entries in the Entry Point 552, the Root Table 504, and the one or more Child Tables 556 can be updated L, M, and N times, respectively, before the Table must be moved to a new location in the non-volatile memory array and the pointer entry pointing to it updated in the Table/data structure above it in the hierarchy (the Parent Table). Each entry in the Logical to Physical Erase Block Table 558 can be updated K times each before a new Logical to Physical Erase Block Table 558 must be created, the current entries moved, and the pointer entry to it in the Entry Point 552 updated. In one embodiment of the present invention, the Logical to Physical Erase Block Table 558 itself can be expanded to be a hierarchy of tables, like the hierarchal address translation data structure 550, to help minimize write fatigue in the non-volatile memory device. It is noted that the abstraction of the Logical Erase Block to Physical Erase Block Table 558 effectively adds more levels of tables/data structures to the hierarchal address translation data structure 550 and further delays updates to the address translation data stored in the hierarchal address translation data structure 550 proper, thus decreasing the number of times the tables/data structures of the hierarchal address translation data structure have to be moved and erased, increasing its advantage for use in a non-volatile memory array.

In FIG. 5B, a logical address of a read/write access request is submitted to the address translation layer which translates it to a physical address by reference to the hierarchal address translation data structure 550 and the Logical to Physical Erase Block Table 558. In this translation, the translation layer references the Entry Point 552 to retrieve the address of (the pointer to) the Root Table 554. The Root Table 554 is then read to determine the Child Table 556 that the address of the memory access is stored in. The address of (the pointer of) the selected Child Table is then retrieved from the Root Table 554 and the selected Child Table 556 accessed. The address entry of the memory access is then retrieved from the Child Table 556. The retrieved entry from the Child Table translates the logical address to a local address and/or a logical erase block. The pointer to the Logical to Physical Erase Block Table 558 is taken from the Entry Point 552 and the Logical to Physical Erase Block Table 558 utilized to translate the logical erase block ID to a physical erase block ID in the non-volatile memory array. The translated local address is then accessed in the physical erase block in the non-volatile memory array or the physical erase block is scanned to locate the accessed sector. The abstracted erase block address translation of the hierarchal address translation data structure 550 of FIG. 5B allow for the erase blocks of the non-volatile memory device to be moved around, erased, and reclaimed with only having to update the entries in the Logical to Physical Erase Block Table 558. The translation data entries in the Child Tables 556 do not have to be updated, improving system performance for these operations and reducing write fatigue inducing updates in the Child Tables 556.

As with the hierarchal address translation data structure 500 of FIG. 5A, each of the data entries in the Entry Point 552, the Root Table 554, and the one or more Child Tables 556 of the hierarchal address translation data structure 550 can be updated L, M, and N times, respectively, before the Table must be moved to a new location in the non-volatile memory array and the pointer entry pointing to it updated in the Table/ data structure above it in the hierarchy. In addition, entries of the Logical to Physical Erase Block Table 558 can be updated K times before the Logical to Physical Erase Block Table 558 must be moved when one of the entries is updated a K+1 time. In updating the Logical to Physical Erase Block Table 558 after an erase block is reclaimed or moved, if the entry in the Logical to Physical Erase Block Table 558 is filled (all K spaces in the entry have been used), a new the Logical to Physical Erase Block Table is created and the most recent entries from the old Logical to Physical Erase Block Table 558 are copied into it, along with the currently updated logical erase block to physical erase block address entry. The pointer to the Logical to Physical Erase Block Table 558 is then changed in the Entry Point 552 to point to the new Logical to Physical Erase Block Table 558 and the old Logical to Physical Erase Block Table 558 scheduled for deletion. If the Logical to Physical Erase Block Table pointer entry in the Entry Point 552 is filled (all L spaces in the pointer entry have been used), a new Entry Point 552 is created and the most recent entries from the old Entry Point 552 are copied into it, along with the currently updated Logical to Physical Erase Block Table entry/pointer. As stated above, typically L, M, N, and K are determined based on a selected base unit of storage of the memory device, such as a row and/or sector/cluster size, and the number of times the table or data structure can be updated within in this base unit of storage.

FIGS. 6A to 6E detail state transition diagrams of a program operation for hierarchal address translation systems of non-volatile memory devices of the present invention showing system initialization, access, update and erase block reclaiming.

Figure 6A:
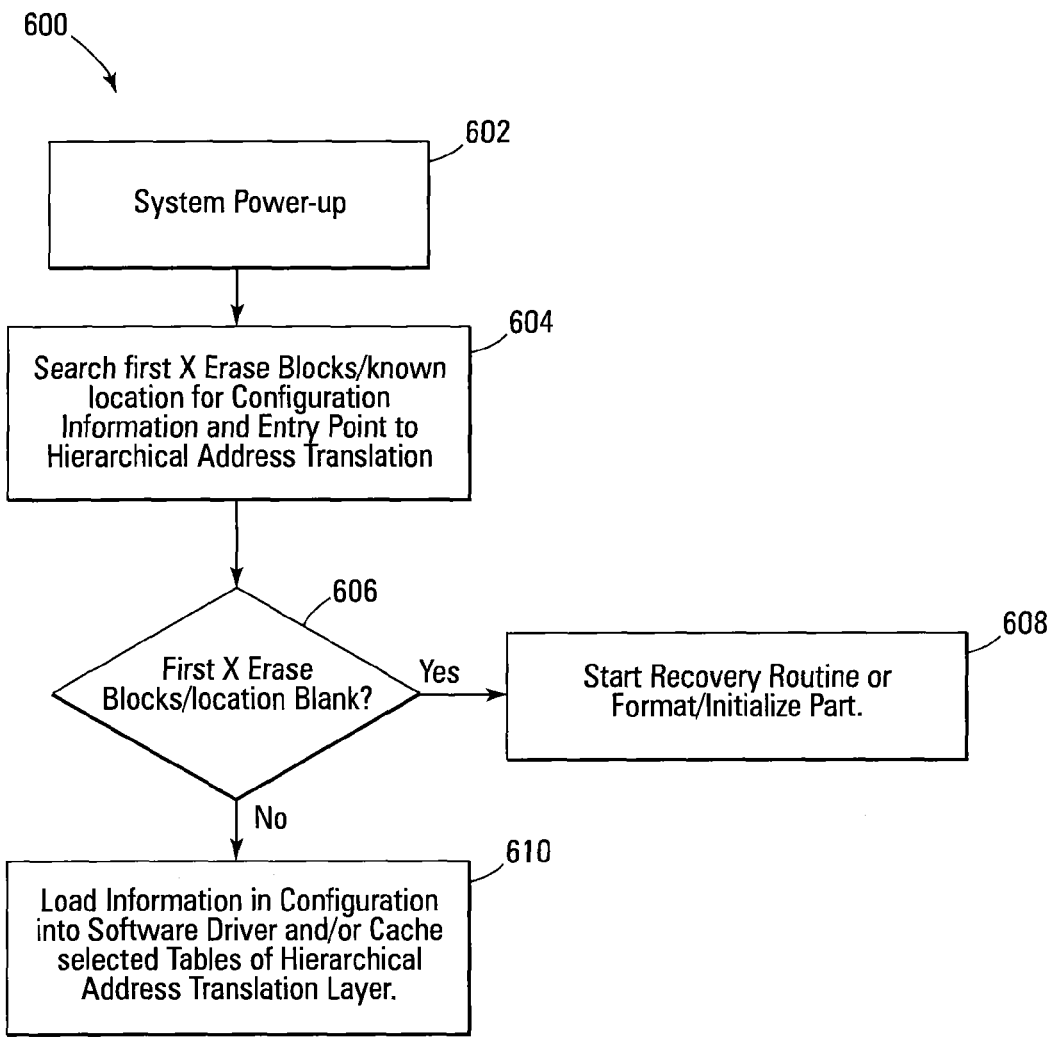

FIG. 6A details a state transition diagram 600 for system/non-volatile memory initialization for an address translation system for non-volatile memory devices of the present invention. As shown in FIG. 6A, at system power-up 602, the system searches the known start address location or the Control Area (typically the first X number of erase blocks) for the Entry Point 604. If the known start address location/Control Area/first X erase blocks are blank 606 the non-volatile memory device is assumed to have been erased or is blank and starts formatting operations 608. If the Entry Point is found at the known start location or within the first X erase blocks the system locates the non-volatile memory device configuration information from it and loads the device configuration 610. If desired, at this time the system can also cache selected data structures and tables of the address translation system to speed up operation of the address translation layer. If the data of the known start address location/Control Area or the Entry Point or the loaded address translation system is incomplete or damaged, a Recovery Process is started.

Figure 6B:
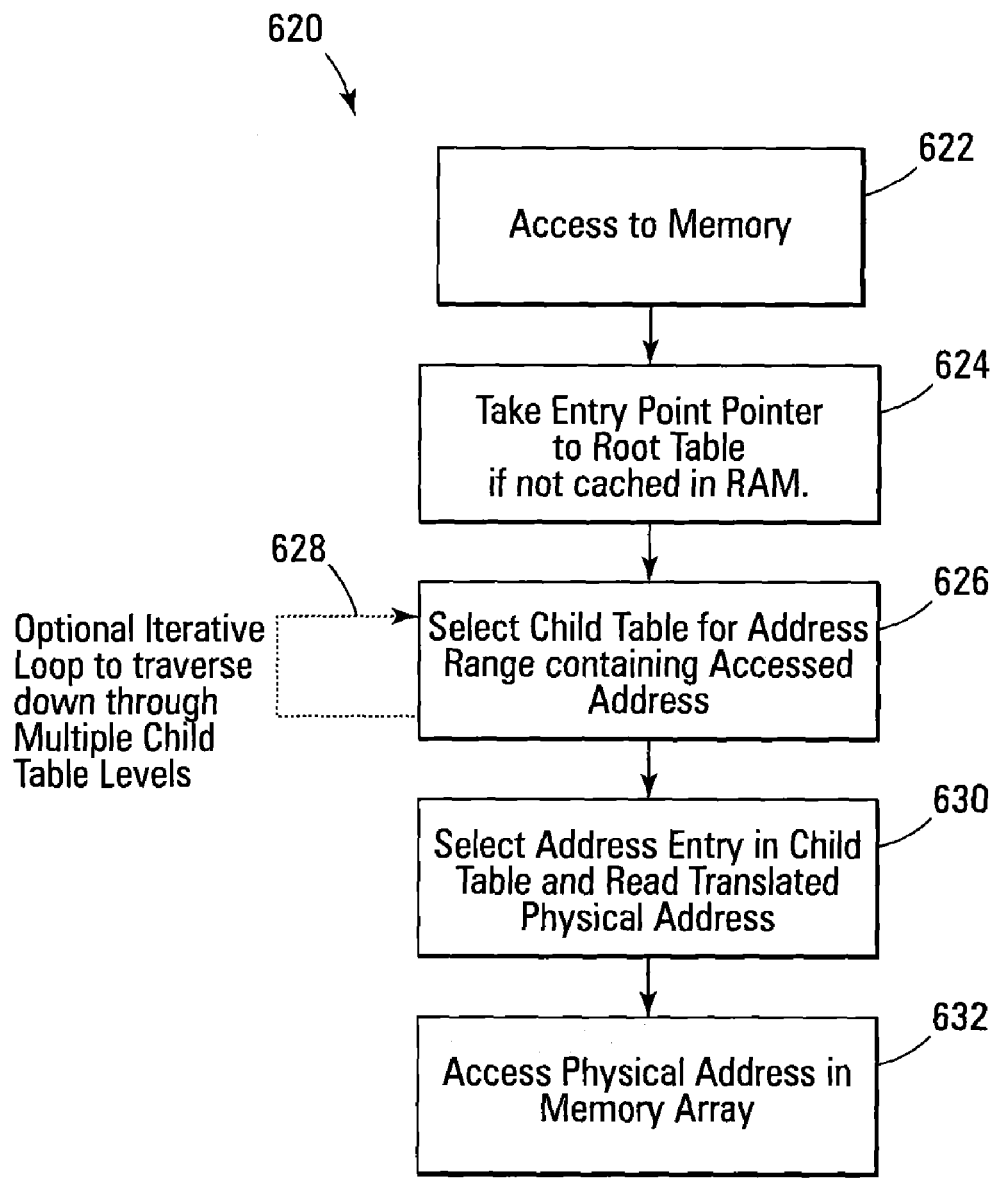

FIG. 6B details a state transition diagram 620 for translating a logical address for memory access to a physical address for non-volatile memory devices of the present invention. As shown in FIG. 6B, upon receiving a memory access request 622 (a read, write, etc.) to the non-volatile memory array, the logical address is translated to a physical address by reference to the hierarchal address translation data structure 500 of FIG. 5A. The pointer to the Root Table 504 from the Entry Point 502 is taken 624 by the translation layer to retrieve the Root Table 504, if it is not already cached in system RAM. The address of (the pointer of) the Child Table 506 containing the address containing the accessed address is then retrieved 626 from the Root Table 504 and the selected Child Table 506 accessed. This selection and access of a Child Table 626 can be optionally repeated 628 to traverse any additional layers of Child Tables 506, from parent to child, until a Child Table 506 that is a terminal leaf of the hierarchal address translation data structure tree 500 is reached. The address entry of the memory access is then retrieved 630 from the Child Table 506 and the translated physical address accessed 632 in the memory array.

Figure 6C:
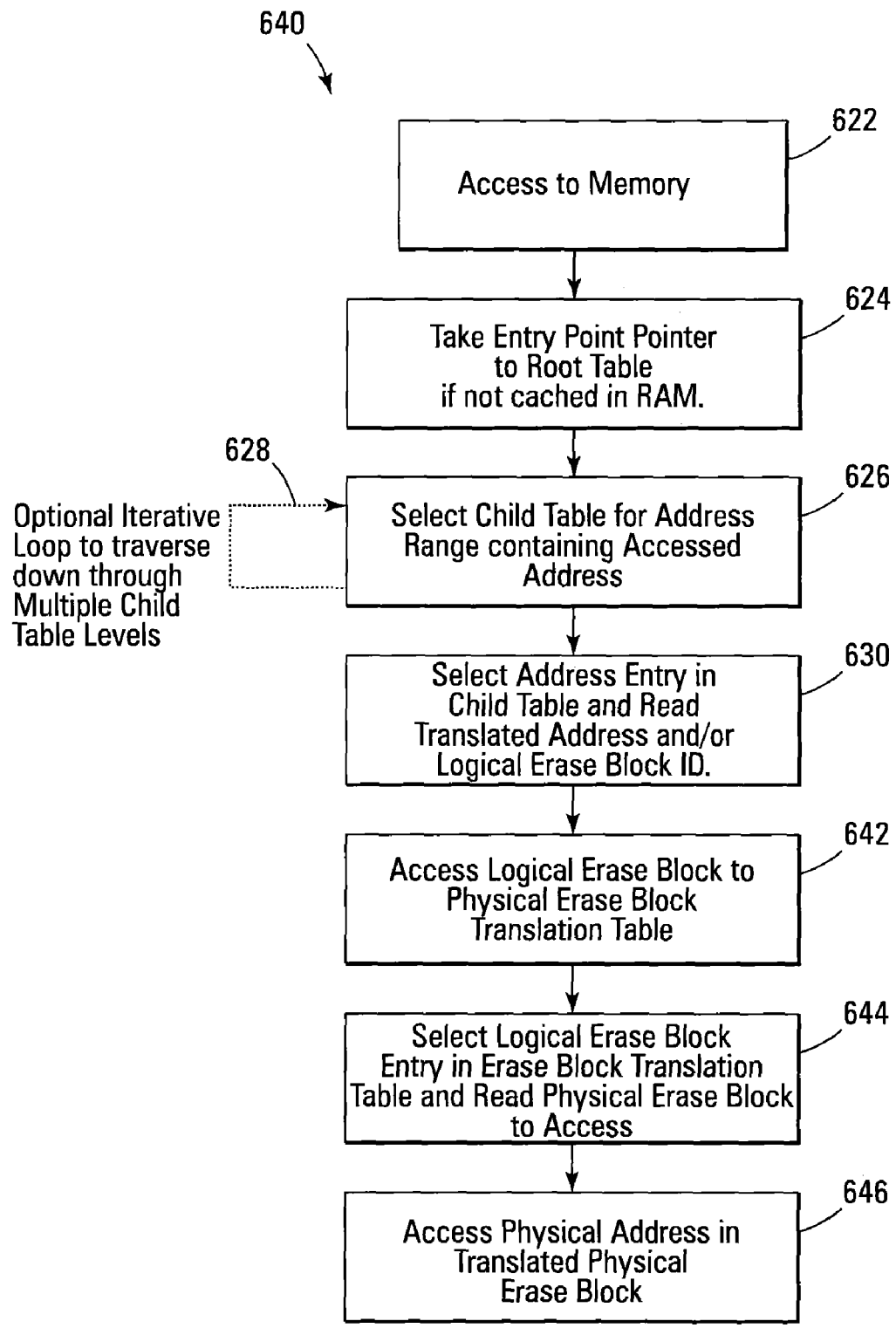

FIG. 6C details a state transition diagram 640 for translating a logical address for memory access to a physical address for non-volatile memory devices of the present invention utilizing erase block abstraction. As shown in FIG. 6C, upon receiving a memory access request 622 (a read, write, etc.) to the non-volatile memory array, the logical address is translated to a physical address by reference to the hierarchal address translation data structure 550 of FIG. 5B. The pointer to the Root Table 554 from the Entry Point 552 is taken 624 by the translation layer to retrieve the Root Table 554. The address of (the pointer of) the Child Table 556 containing the accessed address is then retrieved 626 from the Root Table 554 and the selected Child Table 556 accessed. This selection and access of a Child Table 626 can be optionally repeated 628 to traverse any additional layers of Child Tables 556 until a Child Table 556 that is a terminal leaf of the hierarchal address translation data structure tree 550 is reached. The address entry of the memory access and logical erase block ID are then retrieved 630 from the Child Table 556. The pointer to the Logical to Physical Erase Block Table 558 from the Entry Point 552 is taken 642 by the translation layer to retrieve the Logical to Physical Erase Block Table 558. The erase block translation entry for the logical erase block ID is then retrieved 644 from the Logical to Physical Erase Block Table 558. The translated physical erase block and local physical address of the memory access is then accessed 646 in the memory array.

FIG. 6D details a state transition diagram 650 for updating the translation data of the hierarchal address translation data structure 500, 550 for non-volatile memory devices of the present invention utilizing erase block abstraction. As shown in FIG. 6D, upon updating/writing 652 new data to a blank/erased location in the non-volatile memory array, the Child Table 506, 556 containing the updated/new address entry is retrieved from the hierarchal address translation data structure 500, 550 by retrieving 654 the Root Table 504, 554 and then retrieving 656 the Child Table 506, 556 containing the address of the new/updated logical address. As above, this selection and access of a Child Table 656 can be optionally repeated 658 to traverse any additional layers of Child Tables 506, 556. The address entry for the updated address is then retrieved 660 and checked to see if update space is available 662. If update space is available, the updated address entry is written 664 to the Child Table 506, 556 and the update process finishes 676. If no update space is available in the Child Table 506, 556, the process enters a loop 678 to traverse back up the hierarchal address translation data structure 500, 550. In this loop 678, a new current table/data structure is created 666 and the most-current entries of the old table/data structure copied over to it along with the currently updated entry. If the space required for a new current table/data structure is not available, a blank erase block may need to be reclaimed to provide the required data space first by performing garbage collection and erasure operation on a currently utilized erase block. The pointer entry to the current table/data structure in the parent table/data structure is checked 670 to see if update space is available. If update space is available in the pointer entry in the parent table/data structure, the pointer is updated to point to the current table 672 and the update process finishes 676.

Otherwise, if update space is not available in the parent table/data structure and the current table/data structure is not the Entry Point data structure 668, the update process loops 678 to create a new table/data structure with the parent table/data structure set as the current table/data structure 674. If the current table/data structure is the Entry Point data structure 502, 552, the update process finishes 676. Upon looping 678, a new parent table/data structure (now being utilized as the current table/data structure in the present iteration of the loop) is created and populated with the most-current entries of the old parent table/data structure 666 and the update space in its parent table/data structure checked as described above. This process continues traversing back up the hierarchal address translation data structure 500, 550 until a parent table with update space available in its pointer entry is found or the Entry Point 502, 552 is reached and updated.

Figure 6E:
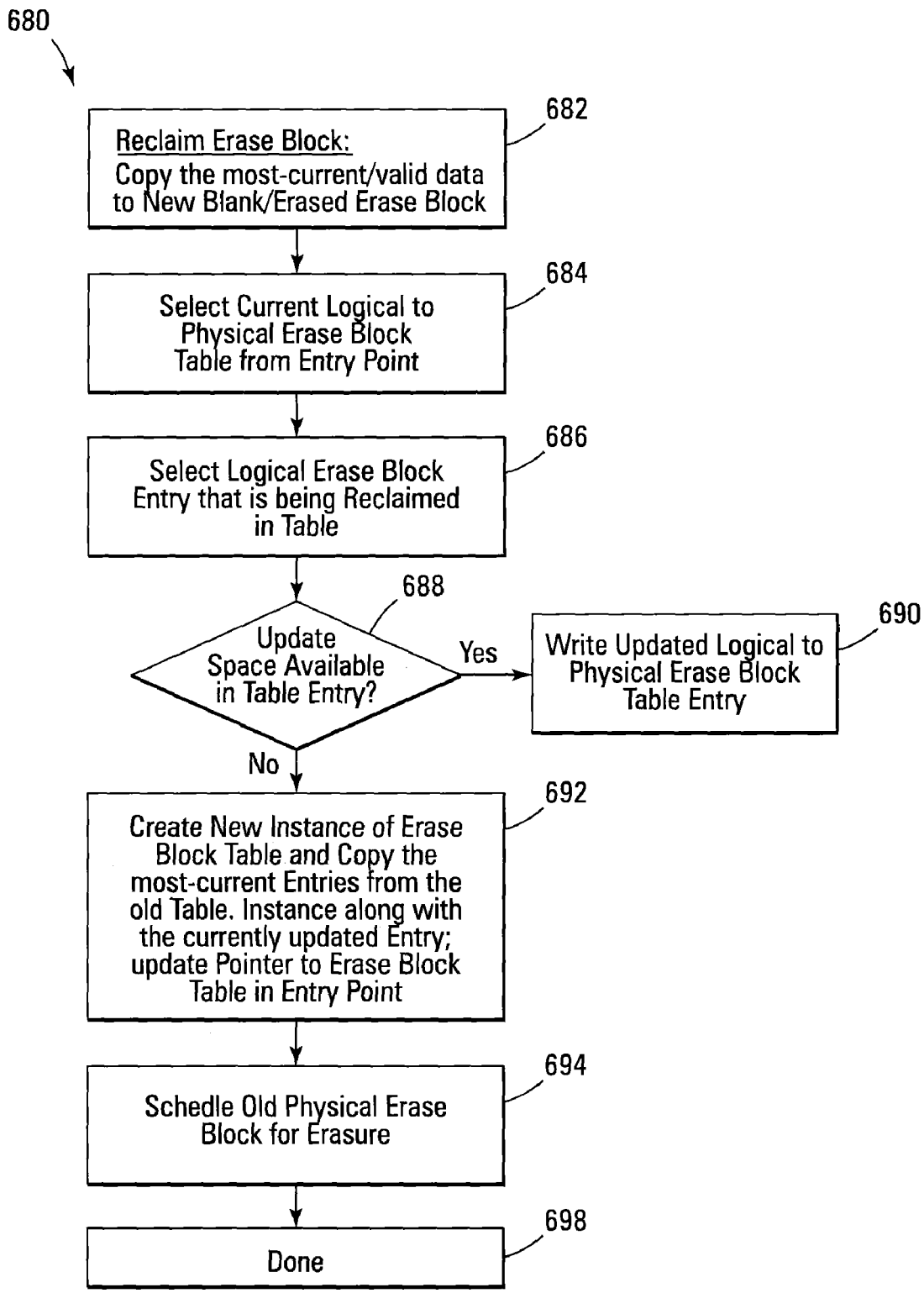

FIG. 6E details a state transition diagram 680 for reclaiming/moving erase blocks in non-volatile memory devices of the present invention utilizing erase block abstraction. As shown in FIG. 6E, upon moving/reclaiming 682 an erase block to a blank/erased erase block in the non-volatile memory array, the most-current data (in versioning embodiments) or currently valid data (in non-versioning embodiments) is copied from the old erase block to a new location in a blank/erased erase block. The Logical to Physical Erase Block Table 558 is retrieved 684 utilizing the pointer from the Entry Point 552 and the erase block translation entry for the logical erase block ID in the Logical to Physical Erase Block Table 558 is selected 686. The erase block translation entry is checked for available update space 688. If space is available in the erase block translation entry, the updated entry mapping the logical erase block ID to the new physical erase block is written 690 to the Logical to Physical Erase Block Table 558, the old erase block is scheduled for erasure 694, and the process finishes 698. If update space is not available in the erase block translation entry, a new Logical to Physical Erase Block Table 558 is created, the most-current erase block translation entries are copied over to it along with the currently updated entry, and the pointer to the Logical to Physical Erase Block Table 558 in the Entry Point 552 is updated 692. If space is not available in the pointer in the Entry Point 552, a new Entry Point 552 data structure is created and the current data copied to it. The old erase block is then scheduled for erasure 694 and the process finishes 698.

Figure 7:
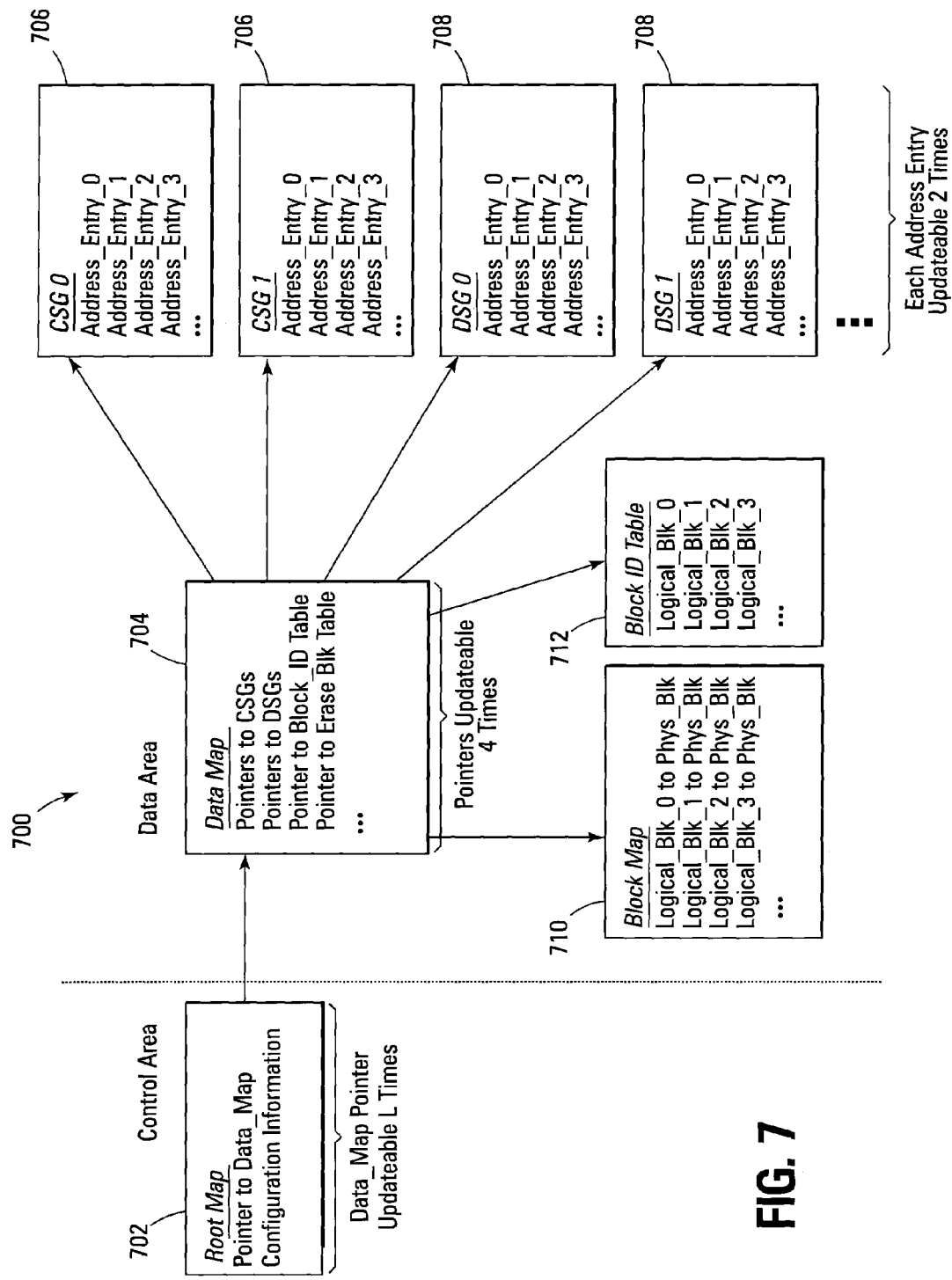
FIG. 7 details a hierarchal address translation system and data structure in accordance with one embodiment of the present invention.

FIG. 7 details a simplified block diagram of a hierarchal address translation data structure 700 of another embodiment of the present invention. In FIG. 7, the hierarchal address translation data structure 700 comprises a Data_Root entry point 702, a Data_Map Table 704, one or more consecutive sector groups (CSG, containing cluster address translation tables) Tables 706, one or more discrete sector group (DSG, containing address translation tables to individually stored sectors) Tables 708, a Block_Map Table 710, and a Block_ID Table 712. The Data_Root entry point 702 resides in a defined Control Area of reserved erase blocks (for example, the first 10 erase blocks of 2048 erase blocks) of the non-volatile memory array and can be located at start-up/power-up by a scan of the Control Area. The Data_Root 702 contains a pointer entry to the Data_Map 704 and the configuration data for the memory device, eliminating the need for a scan of the memory device to characterize it for the firmware/driver. The Data_Map Table 704 contains a series of pointer entries to the physical locations in the memory array of each of the cluster based consecutive sector groups (CSG) Child Tables 706. The CSG Tables are divided by ranges of addresses and contain address translation data entries for the cluster grouped data stored in the non-volatile memory device. The Data_Map Table 704 also contains a series of pointer entries to the physical locations of each of the discrete sector group (DSG) Child Tables 708, which contain address translation data entries for individually stored sectors or single sector clusters that store frequently updated sectors. The Data_Map Table 704 also contains pointers to the Block_Map 710 and Block_ID 712 Tables. The Block_ID Table 712 stores logical erase block to physical erase block address translation data for erase block abstraction. The Block_Map Table 710 stores erase block configuration data, such free, bad, and utilized data blocks for block allocation purposes.

In the hierarchal address translation data structure 700 of FIG. 7, each of the CSG Tables 706 and DSG Tables 708 can be updated two or four times, depending on size of the tables (page size divided by the table size equals numbers of in-place updates possible) before a new CSG/DSG Table is created and the current address translation data moved. Each of the pointer entries in the Data_Map 704 and Data_Root 702 tables can be updated four times each before a new Table must be created and the current data moved. The entries of the Block_Map 710 and Block_ID 712 Tables can be written only once and so any updates require new Block_Map 710 and Block_ID 712 Tables to be created and the data updated and moved. It is noted that the number of updates depends on the size of the table/data structure and the number of update entries it has available and thus the above description is not to be taken as limiting on the number of possible updates of the hierarchal address translation data structure 700 described in FIG. 7.

In FIG. 7, a logical address of a read/write access request submitted to the address translation layer is translated to a physical address by reference to the hierarchal address translation data structure 700 and the logical to physical erase block Block_ID 712 translation table. In this translation, the translation layer references the Data_Root 702 to retrieve the address of (the pointer to) the Data_Map Table 704. The Data_Map Table 704 is then read to determine the CSG Table 706 or DSG Table 708 that the address of the memory access is stored in. The address of (the pointer of) the selected CSG/DSG Table is then retrieved from the Data_Map Table 704 and the selected CSG/DSG Table 706, 708 accessed. The address entry of the memory access is then retrieved from the CSG/DSG Table 706, 708. The retrieved entry from the CSG/DSG Table 706, 708 translates the logical address to a logical erase block ID. The pointer to the Block_ID 712 is taken from the Data_Map 704 and the Block_ID 712 utilized to translate the logical erase block ID to a physical erase block ID in the non-volatile memory array. The translated physical erase block in the non-volatile memory array is then scanned to locate the highest version number of the accessed sector.

FIGS. 8A to 8D detail state transition diagrams of a program operation for the hierarchal address translation system 700 of FIG. 7, showing system initialization, access, update and erase block reclaiming.

Figure 8A:
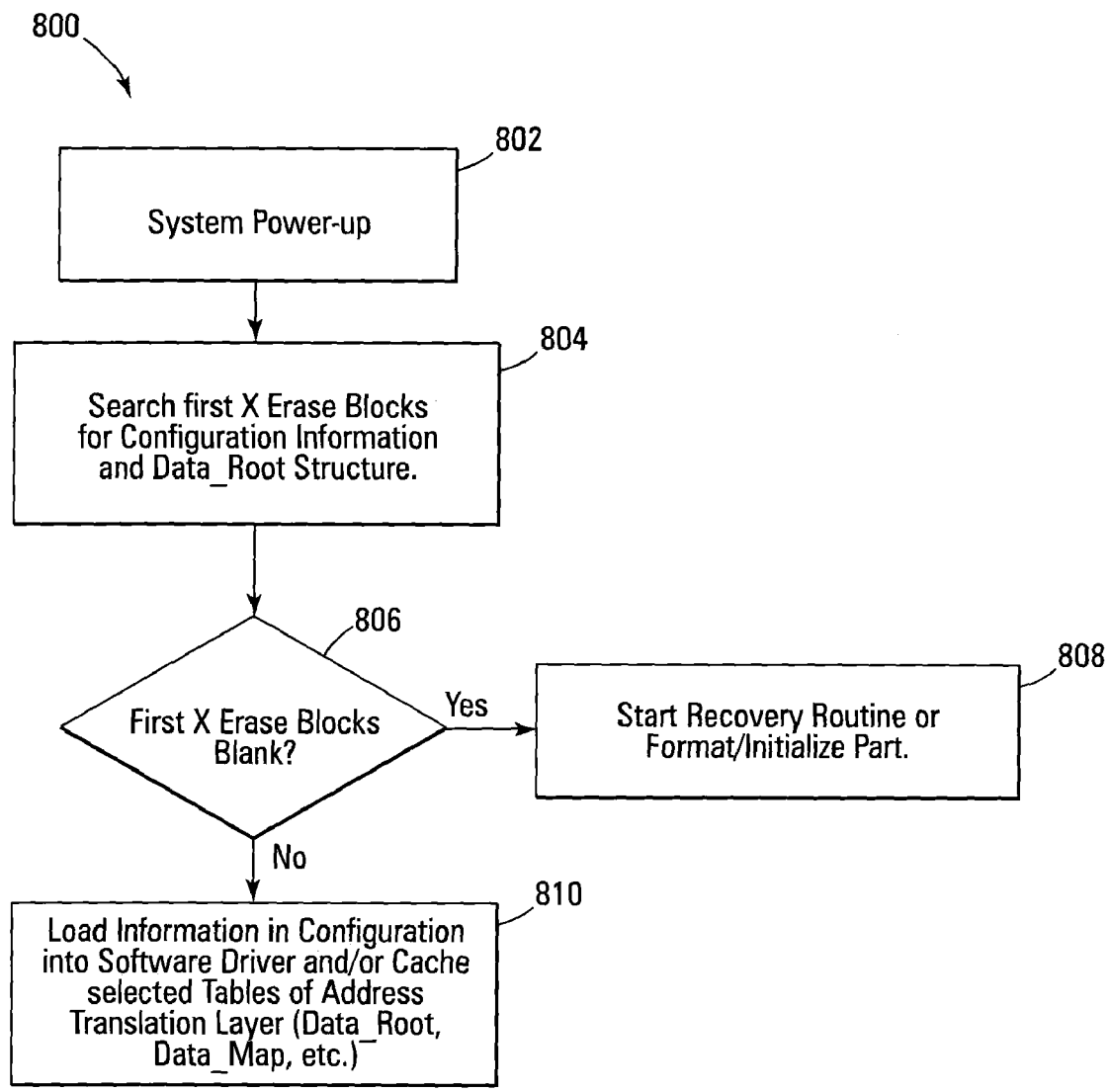
FIGS. 8A-8D detail flowcharts of hierarchal address translation in accordance with one embodiment of the present invention.

FIG. 8A details a state transition diagram 800 for system/non-volatile memory initialization for the hierarchal address translation system 700 of FIG. 7. As shown in FIG. 8A, at system power-up 802, the system searches 804 the Control Area (typically the first X number of erase blocks) for the Data_Root 702. If the erase blocks of the Control Area are blank 806, the non-volatile memory device is assumed to have been erased or is blank and recovery or formatting operations are then started 808. If the Data_Root 702 is found in the X erase blocks of the Control Area, the system locates the non-volatile memory device configuration information from it and loads the device configuration 810 and, if desired, caches selected data structures and tables of the hierarchal address translation system 700 in RAM to speed up operation of the address translation layer. If the data of the Data_Root 702 or Control Area or the loaded hierarchal address translation system 700 is incomplete or damaged, a Recovery Process for the hierarchal address translation system 700 is started.

Figure 8B:
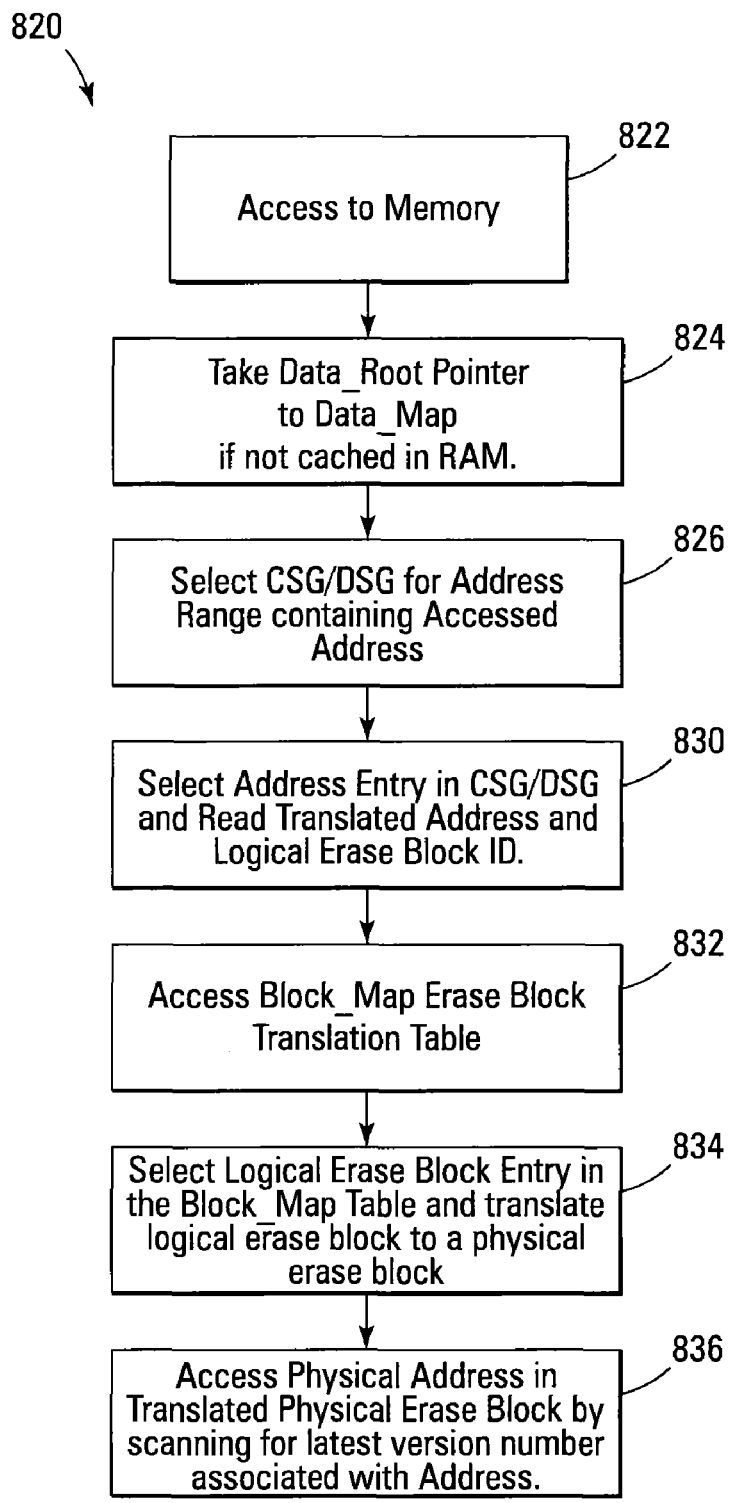

FIG. 8B details a state transition diagram 820 for translating a logical address for memory access to a physical address for the hierarchal address translation system 700 of FIG. 7. As shown in FIG. 8B, upon receiving a memory access request 822 (a read, write, etc.) to the non-volatile memory array, the logical address is translated to a physical address by reference to the hierarchal address translation data structure 700. The pointer from the Data_Root 702 to the Data_Map 704 is taken 824 by the translation layer to retrieve the current Data_Map Table 704. The address of (the pointer of) the CSG/DSG Table 706, 708 containing the accessed address is then retrieved 826 from the Data_Map Table 704 and the selected CSG/DSG Table 706, 708 accessed. The address translation entry and logical erase block ID of the memory access are then retrieved 830 from the CSG/DSG Table 706, 708. The pointer to the current Block_ID Table 712, stored in the Data_Map 704, is taken 832 by the translation layer to retrieve the Block_ID erase block translation table 712. The erase block translation entry for the logical erase block ID is then retrieved 834 from the Block_ID 712. The non-volatile memory array is then accessed utilizing the translated physical erase block 836. The access can either scan the physical erase block for the accessed sector ID and/or its latest version number or directly access the location using a translated local physical address of the memory access retrieved from the CSG/DSG Table 706, 708.

Figure 8C:
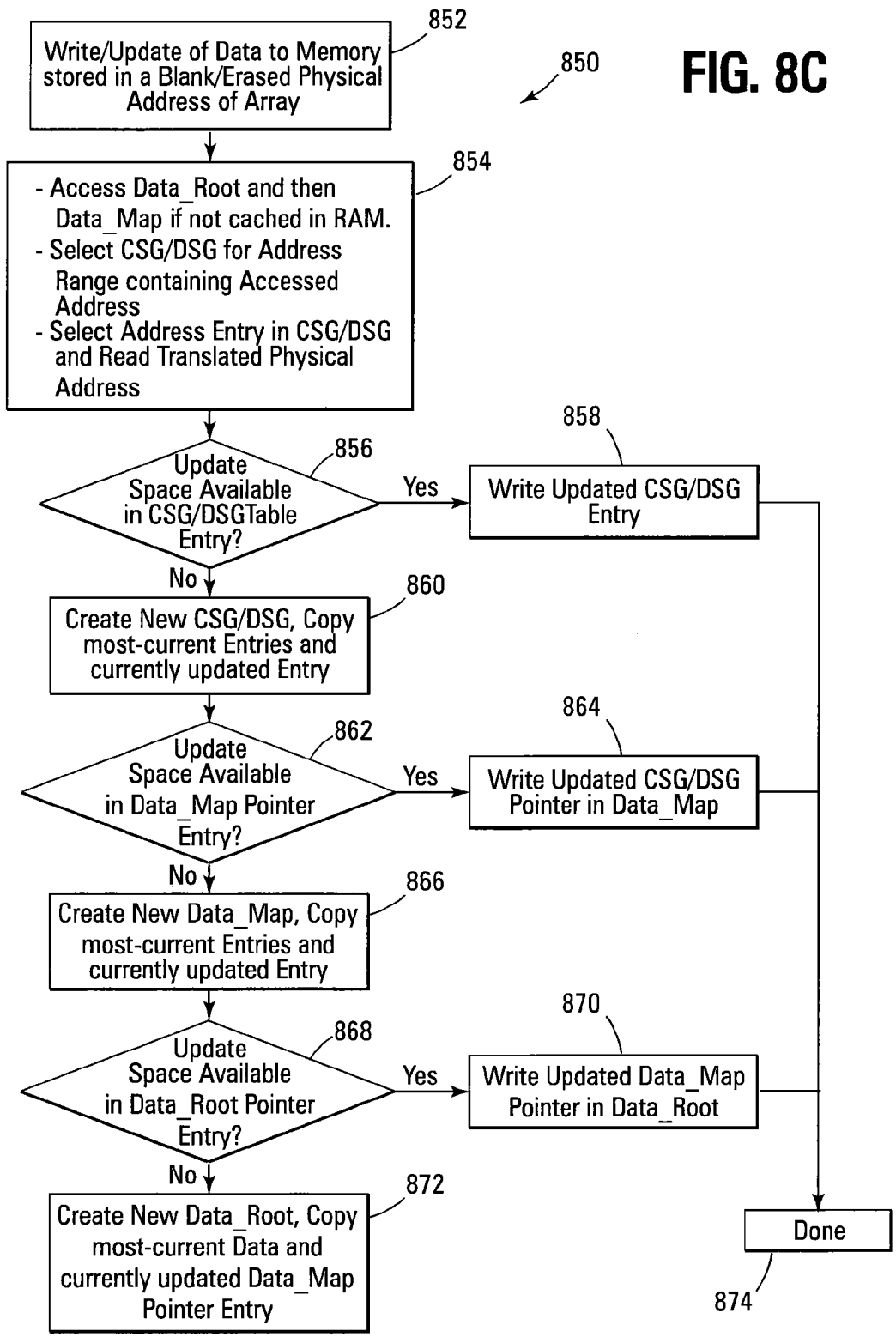

FIG. 8C details a state transition diagram 850 for updating the translation data of the hierarchal address translation system 700 of FIG. 7. As shown in FIG. 8C, upon updating/writing 852 new data to a blank/erased location in the non-volatile memory array, the CSG/DSG Table 706, 708 containing the updated/new address entry is retrieved 854 from the hierarchal address translation data structure 700 by retrieving the Data_Map Table 704 and then retrieving the CSG/DSG Table 706, 708 containing the address of the new/updated logical address and accessing the entry. The address entry for the updated address is then checked to see if update space is available 856. If update space is available, the updated address entry is written 858 to the CSG/DSG Table 706, 708 and the update process finishes 874. If no update space is available in the CSG/DSG Table 706, 708, a new CSG/DSG Table 706, 708 is created and the most-current entries of the old table/data structure copied over to it along with the currently updated entry 860. The Data_Map Table 704 is then checked 862 to see if update space is available in the pointer to the current CSG/DSG Table 706, 708. If update space is available in the pointer entry in the Data_Map Table 704, the pointer is updated to point to the current table 864 and the update process finishes 874. Otherwise, if update space is not available in the Data_Map 704, a new Data_Map Table 704 is created and the most-current entries of the old Data_Map 704 copied over to it along with the currently updated CSG/DSG Table 706, 708 pointer entry 866. The Data_Root 702 is then checked 868 to see if update space is available in the pointer to the current Data_Map 704. If update space is available in the pointer entry in the Data_Root 702, the pointer is updated to point to the current table 870 and the update process finishes 874. Otherwise, if update space is not available in the Data_Root 702, a new Data_Root 702 is created and the most-current entries of the old Data_Root 702 copied over to it along with the currently updated Data_Map 704 pointer entry 872, the process then finishes 874.

Figure 8D:
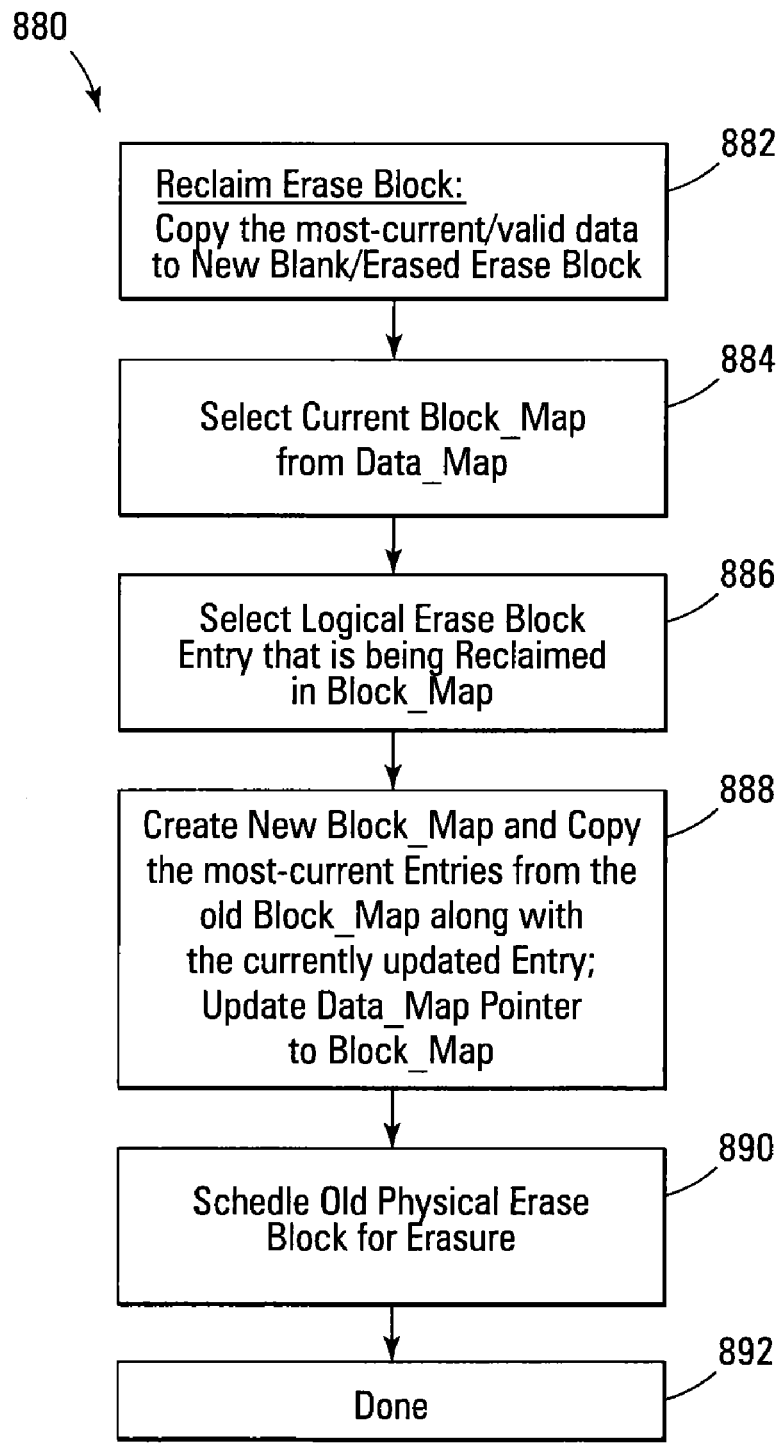

FIG. 8D details a state transition diagram 880 for reclaiming/moving erase blocks in non-volatile memory devices utilizing the hierarchal address translation system 700 of FIG. 7. As shown in FIG. 8D, upon moving/reclaiming 882 an erase block to a blank/erased erase block in the non-volatile memory array, the most-current data is copied from the old erase block to a new location in a blank/erased erase block. The Block_ID Table 712 is retrieved 884 utilizing the pointer from the Data_Map 704 and the erase block translation entry for the logical erase block ID in the Block_ID Table 712 is selected 886. As the Block_Map 710 and Block_ID 712 only contain non-updateable entries they need not be checked for available update space. A new Block_ID Table 712 is created, the most-current erase block translation entries are copied over to it along with the currently updated entry, and the pointer to the Block_ID Table 712 in the Data_Map 704 is updated 888. If space is not available in the Block_ID pointer in the Data_Map 704, a new Data_Map 704 data structure is created and the current data copied to it, and the Data_Map pointer updated as detailed in FIG. 8C. The old erase block is then scheduled for erasure 890 and the utilized/free erase block listing in the Block_Map 710 is updated and the process finishes 892.

It is noted that other address translation apparatuses and methods incorporating embodiments of the present invention are possible and will be apparent to those skilled in the art with the benefit of this disclosure.

CONCLUSION

A non-volatile memory data address translation scheme has been detailed that utilizes a hierarchal address translation system that is stored in the non-volatile memory itself. Embodiments of the present invention utilize a hierarchal address data and translation system wherein the address translation data entries are stored in one or more data structures/tables in the hierarchy, one or more of which can be updated in-place multiple times without having to overwrite data. This hierarchal address translation data structure and multiple update of data entries in the individual tables/data structures allow the hierarchal address translation data structure to be efficiently stored in a non-volatile memory array without markedly inducing write fatigue or adversely affecting the lifetime of the part. The hierarchal address translation of embodiments of the present invention also allow for an address translation layer that does not have to be resident in system RAM for operation.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is intended that this invention be limited only by the claims and the equivalents thereof.

What is claimed is:
1. A method of initializing an address translation system for use with a memory, the method comprising:
   searching for an entry level data structure of a hierarchal address translation data structure; and
   loading a particular version of device configuration data associated with the entry level data structure if the entry level data structure is found;

wherein a pointer corresponding to the configuration data for the memory device is stored within the entry level data structure.

2. The method of claim 1, wherein the particular version of device configuration data comprises a most recent version of device configuration data.

3. The method of claim 1, wherein the entry level data structure comprises an entry point.

4. The method of claim 1, wherein the entry level data structure comprises a data root structure.

5. The method of claim 1, wherein searching for the entry level data structure comprises searching a known location in the memory for the entry level data structure.

6. The method of claim 1, wherein searching for the entry level data structure comprises searching a control area of the memory for the entry level data structure.

7. The method of claim 6, wherein searching the control area comprises searching a first number of erase blocks of the memory for the entry level data structure.

8. The method of claim 1, wherein searching for the entry level data structure comprises searching for the entry level data structure at power-up of a system using the address translation system.

9. The method of claim 1, further comprising starting a formatting operation if the entry level data structure is not found.

10. The method of claim 1, further comprising starting a recovery operation if the entry level data structure is not found.

11. The method of claim 1, further comprising caching selected data structures of the address translation system in system memory.

12. The method of claim 1, further comprising starting a recovery process if data of the entry level data structure is incomplete or damaged.

* * * * *